United States Patent
Saito et al.

(10) Patent No.: US 12,499,724 B2
(45) Date of Patent: Dec. 16, 2025

(54) ENTRY CONTROL APPARATUS, ENTRY CONTROL SYSTEM, ENTRY CONTROL METHOD, AND NON-TRANSITORY COMPUTER-READABLE MEDIUM

(71) Applicant: NEC Corporation, Tokyo (JP)

(72) Inventors: Maya Saito, Tokyo (JP); Kouhei Okinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 221 days.

(21) Appl. No.: 18/023,476

(22) PCT Filed: Sep. 18, 2020

(86) PCT No.: PCT/JP2020/035500
§ 371 (c)(1),
(2) Date: Feb. 27, 2023

(87) PCT Pub. No.: WO2022/059174
PCT Pub. Date: Mar. 24, 2022

(65) Prior Publication Data
US 2023/0316835 A1 Oct. 5, 2023

(51) Int. Cl.
*G07C 9/00* (2020.01)
*G07C 9/20* (2020.01)
(Continued)

(52) U.S. Cl.
CPC ..... *G07C 9/00563* (2013.01); *G07C 9/00571* (2013.01); *G07C 9/215* (2020.01);
(Continued)

(58) Field of Classification Search
CPC ............ G07C 9/00563; G07C 9/00571; G07C 9/215; G07C 9/25; G07C 9/27;
(Continued)

(56) References Cited

U.S. PATENT DOCUMENTS 10,762,184 B2 * 9/2020 Goto .................. G06F 21/40
11,676,433 B2 * 6/2023 Nam .................. G07C 9/247
340/5.7

(Continued)

FOREIGN PATENT DOCUMENTS

JP 2000-315271 A 11/2000
JP 2002-352291 A 12/2002
(Continued)

OTHER PUBLICATIONS

JP2009086912A: access control system and access control method; Apr. 23, 2009; Seguchi Yotaro, Ninomiya Tadashi; Hitachi INF & Comm Eng LTD (Year: 2009).*

(Continued)

*Primary Examiner* — Nam V Nguyen

(57) ABSTRACT

An entry control apparatus receives an application of a user who uses a specific region, from a terminal of a legitimate user of a facility, acquires biometric information of the user when the user is a user other than the legitimate user, registers an accessible range including regions included in a route from a gateway of the facility to the specific region, and biometric information of the user into a storage device in association with each other, controls first biometric authentication of biometric information acquired from the user at a gateway of a predetermined region, with biometric information registered in the storage device, and issues, when the first biometric authentication has succeeded, and the predetermined region is included in the accessible range associated with biometric information of which the first biometric authentication has succeeded, an unlocking instruction to the locking system installed at the gateway of the predetermined region.

16 Claims, 12 Drawing Sheets

(51) Int. Cl.
*G07C 9/25* (2020.01)
*G07C 9/27* (2020.01)
*G07C 9/28* (2020.01)

(52) U.S. Cl.
CPC ............... *G07C 9/25* (2020.01); *G07C 9/27* (2020.01); *G07C 9/28* (2020.01); *G07C 2209/02* (2013.01); *G07C 2209/08* (2013.01)

(58) Field of Classification Search
CPC .. G07C 9/28; G07C 2209/02; G07C 2209/08; G07C 9/38; G07C 9/37; E05B 49/00
USPC ........................................................ 340/5.82
See application file for complete search history.

(56) References Cited

U.S. PATENT DOCUMENTS

| | | | |
|---|---|---|---|
| 11,887,416 B2* | 1/2024 | Hoyer | G07C 9/28 |
| 11,955,723 B2* | 4/2024 | Pirch | G06K 7/10356 |
| 2018/0091641 A1* | 3/2018 | Trani | G07C 9/28 |
| 2018/0167501 A1* | 6/2018 | Peterson | H04W 4/33 |
| 2018/0286156 A1* | 10/2018 | Tamai | G07C 9/28 |
| 2022/0086631 A1* | 3/2022 | Möller | H04W 12/72 |

FOREIGN PATENT DOCUMENTS

| | | |
|---|---|---|
| JP | 2007-231571 A | 9/2007 |
| JP | 2009-086912 A | 4/2009 |
| JP | 2011-164675 A | 8/2011 |
| JP | 2012-043108 A | 3/2012 |
| JP | 2016-001429 A | 1/2016 |
| JP | 2016-085558 A | 5/2016 |
| JP | 2017-097721 A | 6/2017 |
| JP | 2019-085761 A | 6/2019 |
| JP | 6690074 B1 | 4/2020 |
| JP | 6714288 B1 | 6/2020 |
| JP | 2020-119066 A | 8/2020 |

OTHER PUBLICATIONS

JP2020119066A: information processing device, determination method and program; Aug. 6, 2020; Kamio Takashi, Shinozaki Kosuke; Kawamoto Koji; Panasonic IP Man Corp (Year: 2020).*
JP2019085761A: Opening/closing control system; Jun. 6, 2019; Tamura Kazuhiro, Nakamura Taichi; Tsuboya Sakiko et al.; Art KK. (Year: 2019).*
JP6714288B1—Space management system; Jun. 24, 2020; Makita Eri and Ogasawara Osamu; Tsumug Inc, (Year: 2020).*
International Search Report for PCT Application No. PCT/JP2020/035500, mailed on Dec. 1, 2020.
JP Office Action for JP Application No. 2022-550296, mailed on Jan. 10, 2023 with English Translation.
JP Office Action for JP Application No. 2022-550296, mailed on Feb. 14, 2023 with English Translation.

* cited by examiner

| (USER) | USER ID | USAGE APPLICATION PERIOD | (BIOMETRIC INFORMATION) | ACCESSIBLE RANGE |
|---|---|---|---|---|
| FRIEND | U21 | 2020/9/5 13:00 TO 14:00 | FV21 | ENTRANCE 300a |
| PRIVATE TEACHER | U22 | 2020/9/1 15:00 TO 17:00 | FV22 | ENTRANCE 300a STUDY ROOM 300c |
| HOUSEKEEPER | U23 | 2020/9/4 10:00 TO 14:00 | FV23 | ENTRANCE 300a EV HALL 300b RESIDENCE 300d |

Fig. 7

ENTRY CONTROL APPARATUS, ENTRY CONTROL SYSTEM, ENTRY CONTROL METHOD, AND NON-TRANSITORY COMPUTER-READABLE MEDIUM

This application is a National Stage Entry of PCT/JP2020/035500 filed on Sep. 18, 2020, the contents of all of which are incorporated herein by reference, in their entirety.

TECHNICAL FIELD

The present invention relates to an entry control apparatus, an entry control system, an entry control method, and a non-transitory computer-readable medium, and more particularly to an entry control apparatus, an entry control system, an entry control method, and a non-transitory computer-readable medium for controlling entry of a user into a predetermined region.

BACKGROUND ART

In a complex housing such as a condominium building, common facilities exist aside from residences. When a resident uses a common facility, the resident preliminarily makes a user application, makes a reservation, and also makes payment for cost corresponding to usage. In addition, users can include visitors other than residents. In addition, there has been recently an increasing number of complex housings that restrict entry into common facilities and residences using biometric authentication for better security.

Patent Literature 1 discloses a technique for controlling the entry of a visitor into an occupied space using face authentication. Patent Literature 2 discloses a technique for reducing cash handling in payment for usage fees of common facilities and concierge services of complex housings. Patent Literature 3 discloses a technique of determining whether a person other than a person determined for each zone enters a zone.

CITATION LIST

Patent Literature

Patent Literature 1: Japanese Patent No. 6690074
Patent Literature 2: Japanese Unexamined Patent Application Publication No. 2016-085558
Patent Literature 3: Japanese Unexamined Patent Application Publication No. 2020-119066

SUMMARY OF INVENTION

Technical Problem

Here, it is difficult to make a reservation of a flexible usage range suitable for a user (resident or visitor) for a region of a common facility or each residence in a complex housing, and ensuring of security is demanded.

The present disclosure has been made to solve such a problem, and an object of the present disclosure is to provide an entry control apparatus, an entry control system, an entry control method, and a non-transitory computer-readable medium for achieving a reservation of a flexible usage range suitable for a user for a region, and ensuring of security.

Solution to Problem

An entry control apparatus according to a first aspect of the present disclosure includes:
application reception means for receiving an application of a user who uses a specific region, from a terminal of a legitimate user of a facility including a plurality of regions into which entry is restricted in each of a plurality of locking systems,
biometric information acquisition means for acquiring biometric information of the user in a case where the user is a user other than the legitimate user,
registration means for registering an accessible range including regions included in a route from a gateway of the facility to the specific region, and biometric information of the user into a storage device in association with each other,
authentication control means for controlling first biometric authentication of biometric information acquired from the user at a gateway of a predetermined region, with biometric information registered in the storage device, and
unlocking control means for issuing, in a case where the first biometric authentication has succeeded, and the predetermined region is included in the accessible range associated with biometric information of which the first biometric authentication has succeeded, an unlocking instruction to the locking system installed at the gateway of the predetermined region.

An entry control system according to a second aspect of the present disclosure includes:
a plurality of locking systems installed at respective gateways of a plurality of regions, and configured to restrict entry,
a user terminal of a legitimate user of a facility including the plurality of regions, and
an entry control apparatus,
wherein the entry control apparatus includes
application reception means for receiving an application of a user who uses a specific region, from the user terminal,
biometric information acquisition means for acquiring biometric information of the user in a case where the user is a user other than the legitimate user,
registration means for registering an accessible range including regions included in a route from a gateway of the facility to the specific region, and biometric information of the user into a storage device in association with each other,
authentication control means for controlling first biometric authentication of biometric information acquired from the user by the locking system installed at a gateway of a predetermined region, with biometric information registered in the storage device, and
unlocking control means for issuing, in a case where the first biometric authentication has succeeded, and the predetermined region is included in the accessible range associated with biometric information of which the first biometric authentication has succeeded, an unlocking instruction to the locking system installed at the gateway of the predetermined region.

An entry control method according to a third aspect of the present disclosure is an entry control method to be executed by a computer, and includes
receiving an application of a user who uses a specific region, from a terminal of a legitimate user of a facility including a plurality of regions into which entry is restricted in each of a plurality of locking systems, acquiring biometric information of the user in a case where the user is a user other than the legitimate user, registering an accessible range including regions included in a route from a gateway of the facility to the specific region, and biometric information of the user into a storage device in association with each other, controlling first biometric authentication of biometric information acquired from the user at a gateway of a predetermined region, with biometric information registered in the storage device, and issuing, in a case where the first biometric authentication has succeeded, and the predetermined region is included in the accessible range associated with biometric information of which the first biometric authentication has succeeded, an unlocking instruction to the locking system installed at the gateway of the predetermined region.

A non-transitory computer-readable medium storing an entry control program according to a fourth aspect of the present disclosure causes a computer to execute application reception processing of receiving an application of a user who uses a specific region, from a terminal of a legitimate user of a facility including a plurality of regions into which entry is restricted in each of a plurality of locking systems, biometric information acquisition processing of acquiring biometric information of the user in a case where the user is a user other than the legitimate user, registration processing of registering an accessible range including regions included in a route from a gateway of the facility to the specific region, and biometric information of the user into a storage device in association with each other, authentication control processing of controlling first biometric authentication of biometric information acquired from the user at a gateway of a predetermined region, with biometric information registered in the storage device, and unlocking control processing of issuing, in a case where the first biometric authentication has succeeded, and the predetermined region is included in the accessible range associated with biometric information of which the first biometric authentication has succeeded, an unlocking instruction to the locking system installed at the gateway of the predetermined region.

Advantageous Effects of Invention

The present disclosure can provide an entry control apparatus, an entry control system, an entry control method, and a non-transitory computer-readable medium for achieving a reservation of a flexible usage range suitable for a user for a region, and ensuring of security.

BRIEF DESCRIPTION OF DRAWINGS

FIG. 7 is a diagram for describing concept of usage application information according to the second example embodiment.

EXAMPLE EMBODIMENT

Figure 1:
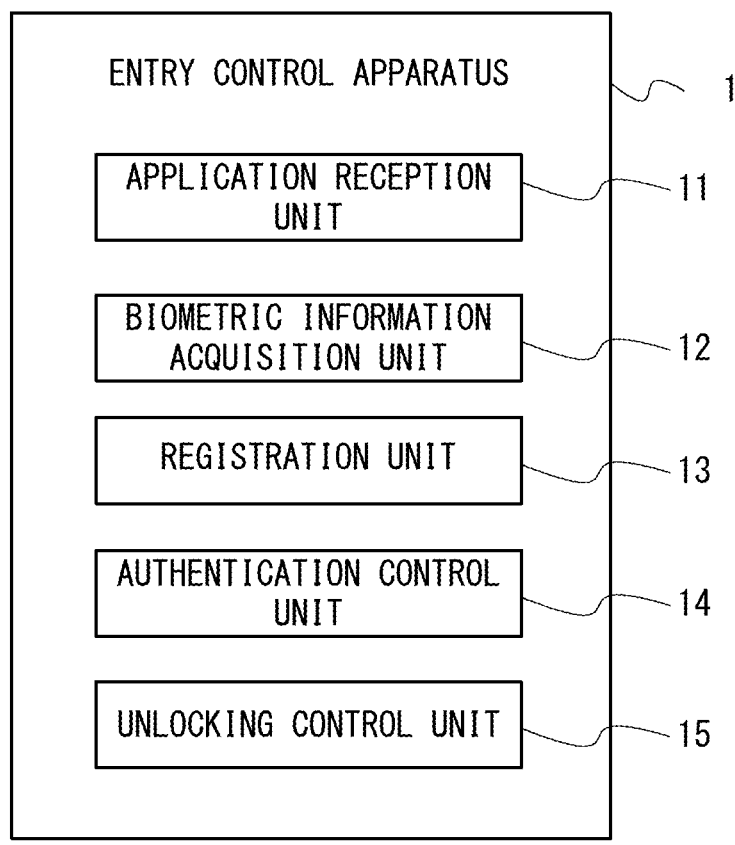
FIG. 1 is a block diagram illustrating a configuration of an entry control apparatus according to a first example embodiment.

Hereinafter, example embodiments of the present disclosure will be described in detail with reference to the drawings. In the drawings, the same or corresponding elements are denoted by the same reference signs, and an overlapping description is omitted as necessary for clarity of description.

First Example Embodiment

FIG. 1 is a block diagram illustrating a configuration of an entry control apparatus 1 according to a first example embodiment. The entry control apparatus 1 is an information processing apparatus for controlling entry into each region by controlling each locking system in a facility including a plurality of regions into which entry is restricted in each of a plurality of locking systems (not illustrated). Here, the entry control apparatus 1 is connected to a network (not illustrated). The network may be a wired network or a wireless network. In addition, each of the plurality of locking systems described above, and a terminal of a legitimate user of the above-described facility are connected to the network. Then, each locking system is installed at a gateway of each region, and the gateway can be unlocked in accordance with an unlocking instruction from the entry control apparatus 1. In addition, the terminal is an information terminal to be operated by a legitimate user. In addition, the entry control apparatus 1 is also connected with a storage device (not illustrated) for registering registration information to be described later.

The entry control apparatus 1 includes an application reception unit 11, a biometric information acquisition unit 12, a registration unit 13, an authentication control unit 14, and an unlocking control unit 15. The application reception unit 11 receives an application of a user who uses a specific region among a plurality of regions, from a terminal of a legitimate user of the above-described facility. At this time, the application includes information regarding a user. In a case where a user is a legitimate user, the information regarding a user is a user ID registered in the entry control apparatus 1, and in a case where a user is a user other than a legitimate user, the information regarding a user is a user name or the like. Thus, the entry control apparatus 1 can determine whether or not a user who has made an application is a legitimate user.

In a case where a user is a user other than a legitimate user, the biometric information acquisition unit 12 acquires biometric information of the user. For example, the biometric information acquisition unit 12 acquires biometric information from a terminal of a legitimate user or a terminal of a user itself. Here, the biometric information is face feature information, iris information, fingerprint information, or the like.

The registration unit 13 registers an accessible range and biometric information of a user into the storage device in association with each other. Here, the accessible range is a range including regions included in a route from a gateway of a facility to a specific region. That is, the accessible range is a set of pieces of information indicating one or more regions.

The authentication control unit 14 controls first biometric authentication of biometric information acquired at a gateway of a predetermined region from a user, with biometric information registered in the storage device. Note that, in a case where biometric information of a plurality of persons is stored in advance in the entry control apparatus 1, the authentication control unit 14 performs authentication processing. Alternatively, in a case where the face feature information of a plurality of persons is stored in advance in an authentication apparatus outside the entry control apparatus 1, the authentication control unit 14 causes the authentication apparatus to perform authentication and acquires the authentication result.

In a case where the first biometric authentication has succeeded, and the predetermined region is included in an accessible range associated with the biometric information of which the first biometric authentication has succeeded, the unlocking control unit 15 issues an unlocking instruction to a locking system installed at the gateway of the predetermined region.

Figure 2:
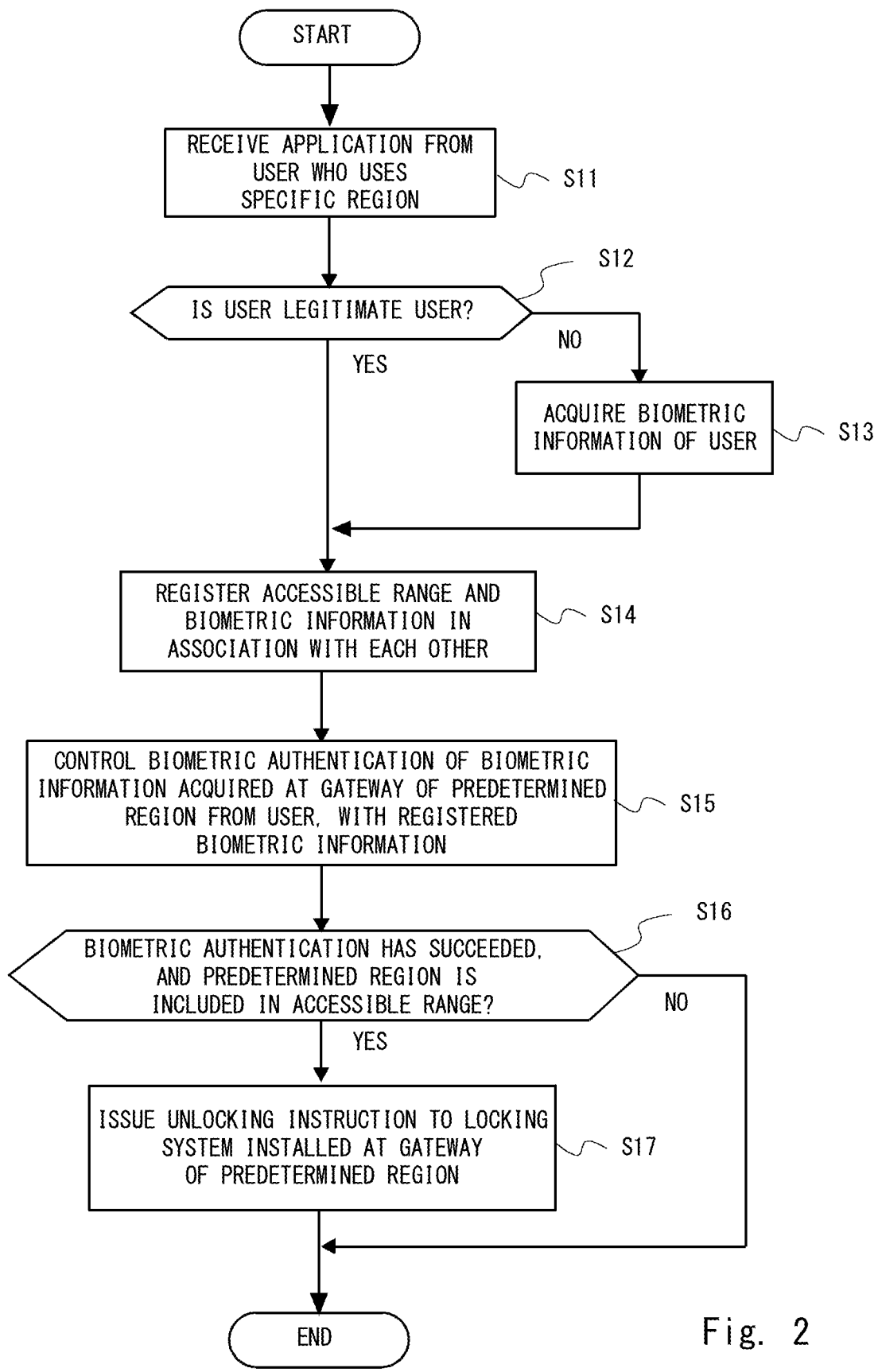
FIG. 2 is a flowchart illustrating a flow of an entry control method according to the first example embodiment.

FIG. 2 is a flowchart illustrating a flow of an entry control method according to the first example embodiment. First of all, the application reception unit 11 receives an application of a user who uses a specific region, from a terminal of a legitimate user of the above-described facility (S11). Next, the entry control apparatus 1 determines whether or not a user who has made an application is a legitimate user (S12). For example, the entry control apparatus determines whether or not the application includes an ID of a legitimate user as a user. In a case where a user is a user other than a legitimate user, the biometric information acquisition unit 12 acquires biometric information of the user (S13).

In a case where it is determined in Step S12 that a user is a legitimate user, or after Step S13, the registration unit 13 registers an accessible range and biometric information of the user into the storage device in association with each other (S14). At this time, the registration unit 13 may identify an accessible range including regions included in a route from a gateway of a facility to a specific region, based on the arrangement of regions in the facility or the like. Alternatively, the registration unit 13 may receive the designation of an accessible range from a terminal of a legitimate user.

After that, the user is assumed to have reached a gateway of a predetermined region. At this time, the biometric information acquisition unit acquires biometric information acquired from a user by a locking system installed at the gateway of the predetermined region. Then, the authentication control unit 14 controls first biometric authentication of biometric information acquired at a gateway of a predetermined region from a user, with biometric information registered in the storage device (S15).

The unlocking control unit 15 determines whether or not the first biometric authentication has succeeded, and the predetermined region is included in an accessible range associated with the biometric information of which the first biometric authentication has succeeded (S16). In a case where it is determined that the first biometric authentication has succeeded, and the predetermined region is included in an accessible range associated with the biometric information of which the first biometric authentication has succeeded (YES in Step S16), the unlocking control unit 15 issues an unlocking instruction to a locking system installed at the gateway of the predetermined region (S17). Note that, in a case where it is determined that the first biometric authentication has not succeeded, or the predetermined region is not included in an accessible range associated with the biometric information of which the first biometric authentication has succeeded (NO in Step S16), the processing ends.

In this manner, when a user makes a usage application for a specific region among a plurality of regions, in a case where the user is an outsider, the biometric information acquisition unit 12 according to the present example embodiment acquires biometric information of the user. Then, the registration unit 13 registers an accessible range including regions included in a route from a gateway of a facility to a specific region, and the biometric information in association with each other. As a result, even in a case where a user goes to the specific region from the gateway of the facility through a plurality of regions, and biometric authentication is performed each time the user passes through a region, usage applications for the respective regions on the route are collectively performed in advance. Thus, reservation of a flexible usage range suitable for a user for a region can be achieved. In addition, a locking system is unlocked conditional upon the success of biometric authentication at a gateway of each region in an accessible range as one of conditions. Thus, ensuring of security can also be achieved.

Note that the entry control apparatus 1 includes a processor, a memory, and a storage device as components not illustrated. Furthermore, the storage device stores a computer program in which processing of an entry control method according to the present example embodiment is implemented. Then, the processor reads the computer program from the storage device into the memory, and executes the computer program. As a result, the processor implements the functions of the application reception unit 11, the biometric information acquisition unit 12, the registration unit 13, the authentication control unit 14, and the unlocking control unit 15.

Alternatively, each of the application reception unit 11, the biometric information acquisition unit 12, the registration unit 13, the authentication control unit 14, and the unlocking control unit 15 may be implemented by dedicated hardware. In addition, some or all of the components of each device may be implemented by a general-purpose or dedicated circuitry, a processor, or the like, or a combination thereof. These may be implemented by a single chip or may be implemented by a plurality of chips connected via a bus. Some or all of the components of each device may be implemented by a combination of the above-described circuit or the like and a program. Furthermore, a central processing unit (CPU), a graphics processing unit (GPU), a field-programmable gate array (FPGA), a quantum processor (quantum processor control chip), or the like can be used as the processor.

Furthermore, in a case where some or all of the components of the entry control apparatus 1 are implemented by a plurality of information processing apparatuses, circuits, and the like, the plurality of information processing apparatuses, circuits, and the like may be arranged in a centralized manner or in a distributed manner. For example, the information processing apparatuses, the circuits, and the like may be implemented in a form in which each of them is connected via a communication network, such as a client server system or a cloud computing system. Furthermore, the function of the entry control apparatus 1 may be provided in a software as a service (SaaS) format.

Second Example Embodiment

Figure 3:
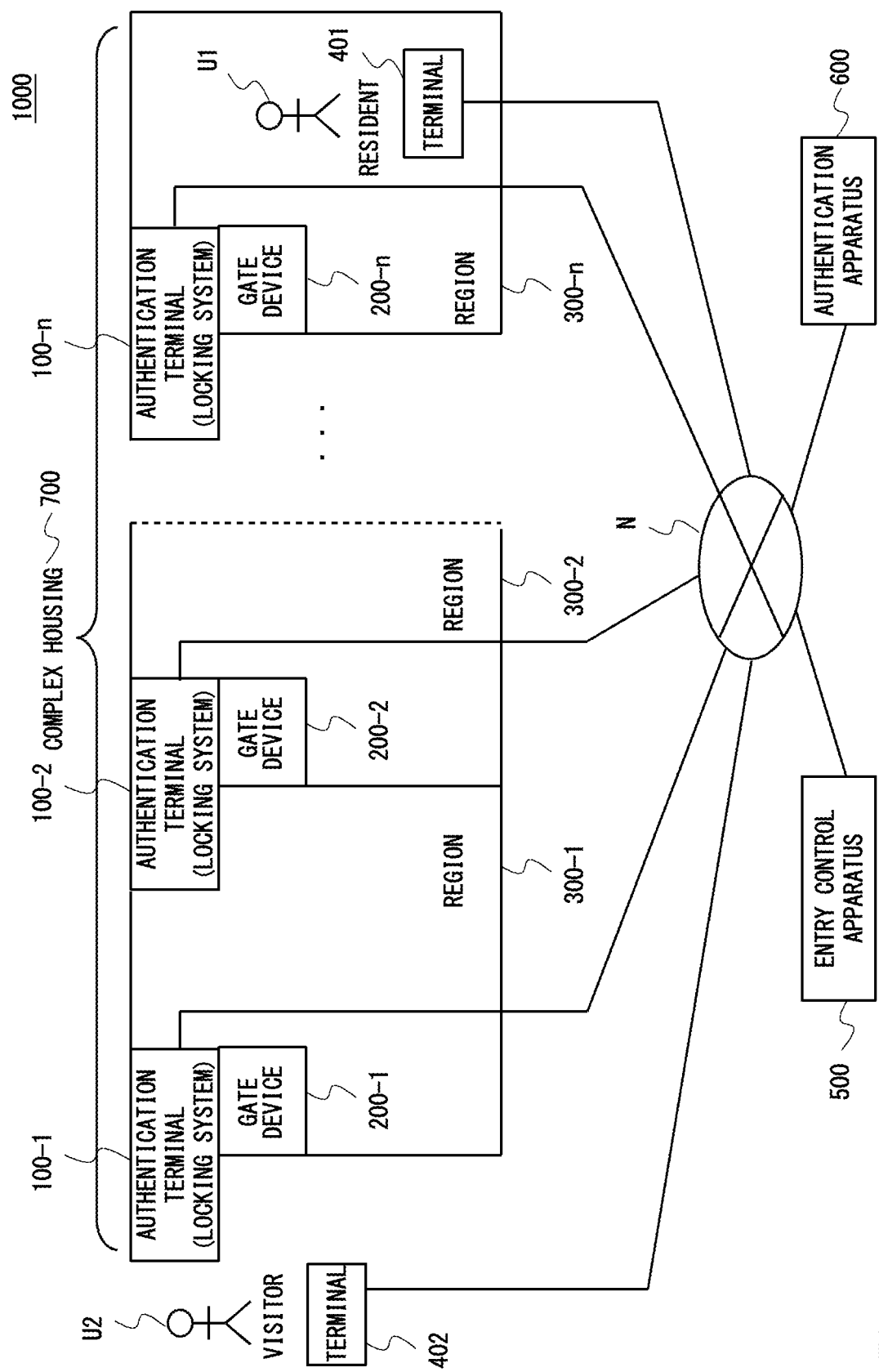
FIG. 3 is a block diagram illustrating a configuration of an entry control system according to a second example embodiment.

A second example embodiment is a specific example of the first example embodiment described above. FIG. 3 is a block diagram illustrating a configuration of an entry control system 1000 according to a second example embodiment. The entry control system 1000 is an information system for controlling entry into each of regions 300-1 to 300-n (n is a natural number equal to or larger than 2.) existing in a complex housing 700. The entry control system includes authentication terminals 100-1 to 100n, gate devices 200-1 to 200-n, terminals 401 and 402, an entry control apparatus 500, and an authentication apparatus 600. In addition, the authentication terminals 100-1 to 100n, the terminals 401 and 402, the entry control apparatus 500, and the authentication apparatus 600 are connected via a network N. Here, the network N is a wired or wireless communication line. In the following description, the biometric authentication is face authentication, and the biometric information is face feature information. However, other technologies using a captured image can be applied to the biometric authentication and the biometric information. For example, as the biometric information, data (feature amount) calculated from a physical feature unique to an individual, such as a fingerprint, a voiceprint, a vein, a retina, or a pattern of an iris of a pupil may be used.

First of all, a resident U1 or the like of the complex housing 700 is assumed to have registered a face image and personal information (name, gender, credit information, or the like) of itself, and terminal information of a terminal to be used, into the entry control apparatus 500 and the authentication apparatus 600. That is, the resident U1 or the like is an example of a legitimate user of the complex housing 700. In addition, common facilities (study room, theater room, parking area, or the like) exist in the complex housing 700 aside from residences. Then, each of the residences and common facilities will be referred to as a "region". In particular, to use common facilities, the resident U1 or the like needs to make a reservation and bear the cost. In addition, at the gateways of the regions 300-1 to 300-n, the authentication terminals 100-1 to 100-n and the gate devices 200-1 to 200-n are installed. For example, at the gateway of the region 300-1, the authentication terminal 100-1 and the gate device 200-1 are installed. Then, the authentication terminal 100-1 and the gate device 200-1 are connected. In addition, the region 300-1 and the region 300-2 are adjacent to each other. Thus, the gateway of the region 300-2 exists at a boundary between the region 300-2 and the region 300-1. Thus, to enter the region 300-2, first of all, a visitor U2 enters the region 300-1 after authentication executed by the authentication terminal 100-1 succeeds and the gate device 200-1 is unlocked. Then, the visitor U2 can enter the region 300-2 after authentication executed by the authentication terminal 100-2 in the region 300-1 succeeds and the gate device 200-2 is unlocked. Then, for the visitor U2 succeeding in authentication and a gate device being unlocked, prior usage application to be described later is required. In addition, even if a user is a resident of the complex housing 700, to use a specific common facility (for example, study room, theater room, parking area, or the like), the prior usage application is required. On the other hand, a gate device at an entrance or an elevator (EV) hall is unlocked by a resident of the complex housing 700 without a prior usage application if authentication succeeds. Note that, in a case where an application target region is a common facility, the entry control apparatus 500 may charge an applicant the cost after a usage application or after actual usage.

Note that, in the following description, the regions 300-1 to 300-n will be sometimes simply referred to as regions 300. Similarly, the authentication terminals 100-1 to 100-n will be sometimes simply referred to as authentication terminals 100. In addition, the gate devices 200-1 to 200-n will be sometimes simply referred to as gate devices 200. In addition, each of the authentication terminals 100-1 to 100-n is an example of a locking system. In addition, the gate device 200 is a flapper gate, an automatic door, or a normal door, for example, and the gate device 200 can be unlocked in accordance with an unlocking instruction from the connected authentication terminal 100.

The authentication apparatus 600 is an information processing apparatus that stores face feature information of a plurality of persons. In response to a face authentication request received from the outside, the authentication apparatus collates a face image or face feature information included in the request, with face feature information of each user, and transmits, as a response, the collation result (authentication result) to a request source.

Figure 4:
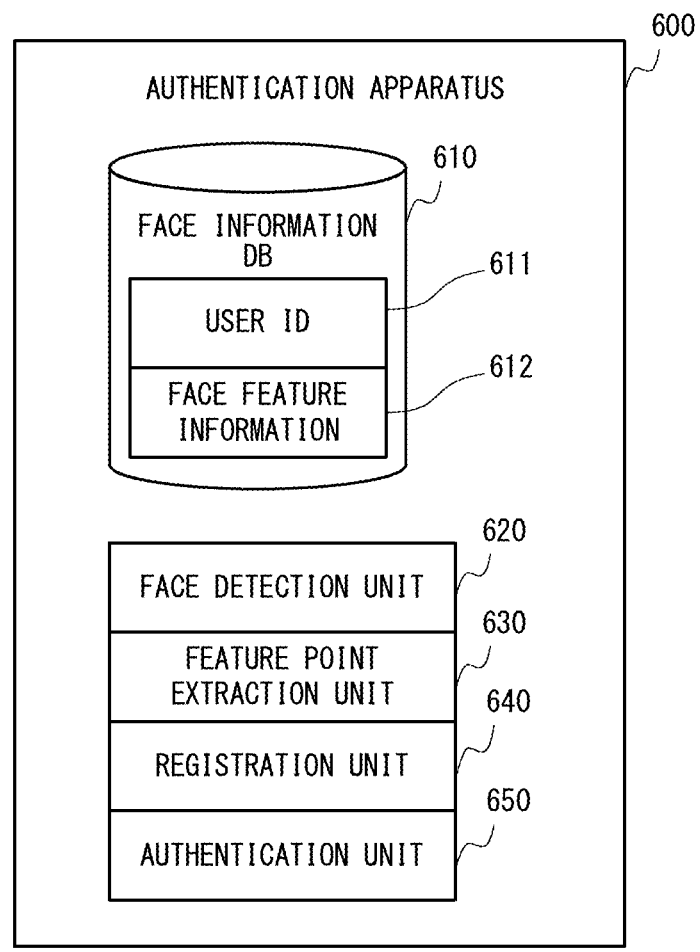
FIG. 4 is a block diagram illustrating a configuration of an authentication apparatus according to the second example embodiment.

FIG. 4 is a block diagram illustrating a configuration of the authentication apparatus 600 according to the second example embodiment. The authentication apparatus 600 includes a face information database (DB) 610, a face detection unit 620, a feature point extraction unit 630, a registration unit 640, and an authentication unit 650. The face information DB 610 stores a user ID 611 and face feature information 612 of the user ID in association with each other. The face feature information 612 is a set of feature points extracted from a face image. Note that the authentication apparatus 600 may delete the face feature information 612 in the face feature DB 610 in response to a request from a user whose face feature information 612 is registered. Alternatively, the authentication apparatus 600 may delete the face feature information 612 after a lapse of a certain period from the registration of the face feature information.

The face detection unit 620 detects a face region included in a registration image for registering face information, and outputs the face region to the feature point extraction unit 630. The feature point extraction unit 630 extracts a feature point from the face region detected by the face detection unit 620, and outputs face feature information to the registration unit 640. In addition, the feature point extraction unit 630 extracts a feature point included in a face image received from the entry control apparatus 500 or the terminal 401 or 402, and outputs face feature information to the authentication unit 650.

The registration unit 640 newly issues the user ID 611 when registering the face feature information. The registration unit 640 registers the issued user ID 611 and the face feature information 612 extracted from a registration image, in association with each other into the face information DB 610. Note that, after registration, the registration unit 640 notifies the entry control apparatus 500 of the user ID 611 and a face image or the face feature information 612. The authentication unit 650 performs face authentication using the face feature information 612. Specifically, the authentication unit 650 collates face feature information extracted from a face image, with the face feature information 612 in the face information DB 610. In a case where collation has succeeded, the authentication unit 650 identifies the user ID 611 associated with the face feature information 612 retrieved in the collation. The authentication unit 650 transmits, as a face authentication result, a response indicating whether or not the pieces of face feature information match each other, to the entry control apparatus 500. Whether or not the pieces of face feature information match each other corresponds to the success or failure of the authentication. A case where the pieces of face feature information match each other means a case where the degree of matching is equal to or higher than a predetermined value. In addition, in a case where face authentication has succeeded, the face authentication result includes the identified user ID.

Note that the authentication unit 650 does not need to attempt collation with all pieces of face feature information 612 in the face information DB 610. For example, it is desirable that the authentication unit 650 preferentially attempts collation with face feature information registered in a period from a date of reception of the face authentication request to a date several days before the date of reception. As a result, a collation speed can be increased. In a case where the preferential collation has failed, it is desirable that collation with all pieces of remaining face feature information is performed.

Figure 5:
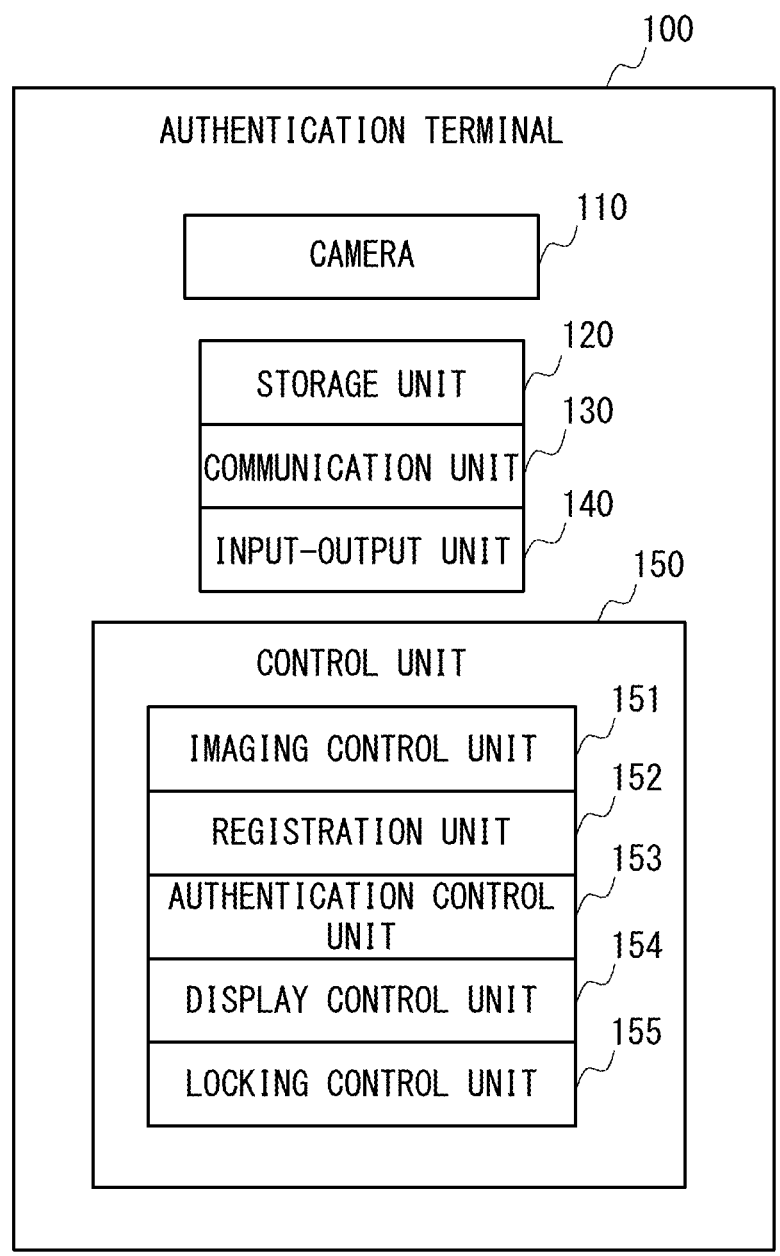
FIG. 5 is a block diagram illustrating a configuration of an authentication terminal (locking system) according to the second example embodiment.

Subsequently, the authentication terminal 100 is an information processing apparatus installed at a gateway of a predetermined region, and connected with the gate device 200 similarly installed at the gateway. FIG. 5 is a block diagram illustrating a configuration of an authentication terminal (locking system) 100 according to the second example embodiment. The authentication terminal 100 includes a camera 110, a storage unit 120, a communication unit 130, an input-output unit 140, and a control unit 150.

The camera 110 is an imaging device that performs image capturing in accordance with the control of the control unit 150. The storage unit 120 is a storage device that stores a program for implementing each function of the authentication terminal 100. The communication unit 130 is a communication interface with the network N. The input-output unit 140 includes a display device (display unit) such as a screen, and an input device. The input-output unit 140 may be a touch panel, for example. The control unit 150 controls hardware included in the authentication terminal 100. The control unit 150 includes an imaging control unit 151, a registration unit 152, an authentication control unit 153, a display control unit 154, and a locking control unit 155.

The imaging control unit 151 controls the camera 110 to capture a registration image or an authentication image of a user existing at a gateway of a predetermined region. The registration image and the authentication image are images at least including a face region of the user (the resident U1 or the visitor U2). The imaging control unit 151 outputs the registration image to the registration unit 152. In addition, the imaging control unit 151 output the authentication image to the authentication control unit 153.

The registration unit 152 transmits a face information registration request including the registration image, to the authentication apparatus 600 via the network N. The authentication control unit 153 transmits a face authentication request including the authentication image, to the entry control apparatus 500 via the network N. At this time, the authentication control unit 153 includes a region ID of a corresponding predetermined region and an image capturing time of the authentication image (face image), into the face authentication request. Note that identification information (terminal ID) of the authentication terminal may be included in place of the region ID. The display control unit 154 receives various types of screen data from the entry control apparatus 500 via the network N, and displays the received screen data on the input-output unit 140. In a case where the locking control unit 155 has received an unlocking instruction from the entry control apparatus 500 via the network N, the locking control unit outputs the unlocking instruction to the corresponding gate device 200.

Returning to FIG. 3, the description will be continued. The terminal 401 is an information terminal owned by the resident U1. The terminal 401 is a mobile phone terminal, a smartphone, a tablet terminal, a personal computer (PC) on which a camera is mounted or to which a camera is connected, or the like, for example. The terminal 401 is associated with a user ID or face feature information of the resident U1. That is, the terminal 401 is a terminal identifiable based on a user ID or face feature information in the entry control apparatus 500. For example, the terminal 401 is a terminal into which the resident U1 has logged using a user ID of itself.

The terminal 401 transmits, to the entry control apparatus 500 via the network N, a usage application including a user name entered by the resident U1 (or a user ID of a resident of the complex housing 700), a specific region (usage application target region), and a usage application period. In addition, the terminal 401 receives an application result (permitted or denied) from the entry control apparatus 500 via the network N, and displays the application result on a screen or the like. In addition, the terminal 401 may transmit a registration request including a face image of the visitor U2 being a user, to the entry control apparatus 500 via the network N. Alternatively, the terminal 401 may transmit a registration destination request to the entry control apparatus 500 via the network N, and transmit registration destination information returned from the entry control apparatus 500, to the terminal 402 of the visitor U2 via the network N. Alternatively, in a case where a user name of a user who has made a usage application is a name of a visitor from the outside, the terminal 401 may receive registration destination information from the entry control apparatus 500 via the network N, and transmit the registration destination information to the terminal of the visitor U2. Here, the registration destination information may be a uniform resource locator (URL) of the authentication apparatus 600 or the like. Then, the terminal 401 receives a user ID issued for the visitor U2, and a face image of the visitor U2, from the entry control apparatus 500 via the network N. The terminal 401 displays the received face image on a screen. The terminal 401 may receive the designation of an accessible range of the visitor U2 based on an entry made by the resident U1. In a case where the resident U1 checks the display of the face image of the visitor U2 and the terminal 401 receives the entry of acceptance, the terminal 401 transmits information indicating the acceptance, to the entry control apparatus 500 via the network N.

The terminal 402 is an information terminal owned by the visitor U2. The terminal 402 is a mobile phone terminal, a smartphone, a tablet terminal, a personal computer (PC) on which a camera is mounted or to which a camera is connected, or the like, for example. In a case where the terminal 402 receives registration destination information from the terminal 401 via the network N, the terminal 402 transmits the face image of the visitor U2 to a destination indicated by the registration destination information, via the network N.

The entry control apparatus 500 is an information processing apparatus for controlling the entry of a user (the resident U1 or the visitor U2) into a predetermined region. The entry control apparatus 500 may be redundant in a plurality of servers, and each functional block may be implemented by a plurality of computers.

Figure 6:
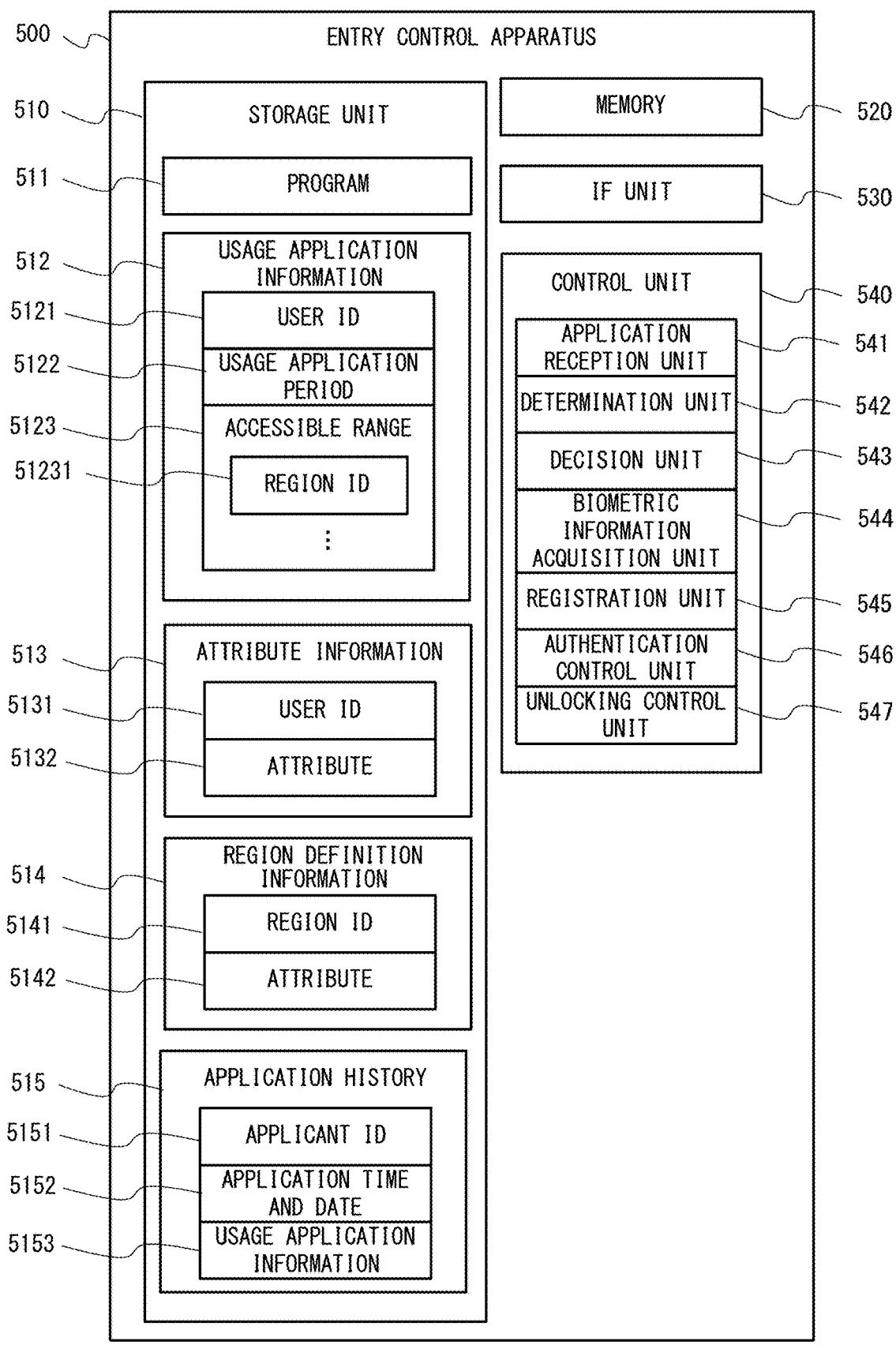
FIG. 6 is a block diagram illustrating a configuration of an entry control apparatus according to the second example embodiment.

Next, the entry control apparatus 500 will be described in detail. FIG. 6 is a block diagram illustrating a configuration of an entry control apparatus according to the second example embodiment. The entry control apparatus 500 includes a storage unit 510, a memory 520, an interface (IF) unit 530, and a control unit 540. The storage unit 510 is an example of a storage device such as a hard disk or a flash memory. The storage unit 510 stores a program 511, usage application information 512, attribute information 513, region definition information 514, and an application history 515. The program 511 is a computer program in which the processing of an entry control method according to the second example embodiment is implemented.

The usage application information 512 is information for managing a permitted usage application among usage applications of a specific region from applicants such as the resident U1. A user ID 5121, a usage application period 5122, and an accessible range 5123 are associated with the usage application information 512. Note that a name of a user may be further associated with the usage application information 512. The user ID 5121 is identification information of a user. The user ID 5121 is identification information of the resident U1 or the like, or identification information of a user other than a legitimate user, such as the visitor U2. Then, the user ID 5121 corresponds to the user ID 611 stored in the face information DB 610 described above. That is, the face information DB 610 and the usage application information 512 are associated with each other via a user ID. The usage application period 5122 is a period during which a user can use regions inside the accessible range 5123. In other words, the usage application period 5122 is a period during which a user is permitted to pass through each region existing before the user reaches a specific region, and to stay in the specific region. The accessible range 5123 is a set of regions through which a user is permitted to pass, or in which a user is permitted to stay. The accessible range 5123 includes one or more region IDs 51231. That is, the accessible range 5123 at least includes a region ID corresponding to a specific region targeted in a usage application. Then, in a case where a user passes through a plurality of regions before reaching a specific region targeted in a usage application, from a gateway of a facility, the accessible range 5123 includes a region ID of each of the regions through which the user passes.

FIG. 7 is a diagram for describing concept of usage application information according to the second example embodiment. It can be said that the usage application information is managed in combination with the usage application information 512 and the face information DB 610. That is, the face feature information 612 associated with the user ID 611 in the face information DB 610 that matches the user ID 5121 of the usage application information 512 corresponds to biometric information. Thus, the usage application information can be substantially said to be information that associates a user ID, a usage application period, biometric information, and an accessible range with each other. For example, the usage application information indicates that, as for a friend U21, an application for "2020/9/5 13:00 to 14:00" as a usage application period, "FY21" as biometric information, and an "entrance 300*a*" as an accessible range has already been made. On the other hand, the usage application information indicates that, as for a private teacher U22, an application for a "study room 300*c*" as an accessible range has been made in addition to the "entrance 300*a*". This is because it is necessary to pass through the "entrance 300*a*", which is another region, to enter the "study room 300*c*". Similarly, as for a housekeeper U23, an application for the "entrance 300*a*", an "EV fall 300*b*", and a "residence 300*d*" as an accessible range has already been made. This is because it is necessary to pass through the "entrance 300*a*" and the "EV fall 300*b*", to enter the "residence 300*d*".

Returning to FIG. 6, the description will be continued. The attribute information 513 is information for managing an attribute of a user (the resident U1 or the like). A user ID 5131 and an attribute 5132 are associated with the attribute information 513. The user ID 5131 is identification information of the resident U1 or the like. The attribute 5132 is information indicating whether the resident U1 or the like is a head of a household of a residence, indicating whether the resident U1 or the like is an adult or a minor, indicating a grade of an owned or a leased residence, or the like. The attribute 5132 may include a user ID of a cohabiter of a user of the associated user ID 5131. In addition, the attribute may include information indicating a family relationship (parent, child) among cohabiters. In addition, the attribute 5132 may include information indicating a hierarchy of authority among cohabiters. For example, the attribute may indicate that, among cohabiters, authorities of a head of a household and a marital partner of the head are relatively stronger, and authority of a child of the head is relatively weaker. In addition, the attribute 5132 may indicate that authority of an adult is stronger than authority of a minor. In addition, the attribute 5132 may be information indicating authority corresponding to a grade of a residence.

The region definition information 514 is information that defines an attribute of an applicant (the resident U1 or the like) whose usage application is to be permitted for each region in the complex housing 700. A region ID 5141 and an attribute 5142 are associated with the region definition information 514. The region ID 5141 is information for identifying the region 300. Note that the region ID 5141 may be a terminal ID of the authentication terminal 100 installed in a corresponding region.

The application history 515 is history information of the usage application information 512. An applicant ID 5151, application time and date 5152, and usage application information 5153 are associated with the application history 515. The applicant ID 5151 is a user ID of the resident U1 or the like who is an applicant. The application time and date 5152 indicate time and date at which an application has been received or permitted. The usage application information 5153 is information corresponding to the usage application information 512.

The memory 520 is a volatile storage device such as a random access memory (RAM), and is a storage region for temporarily holding information when the control unit 540 operates. The IF unit 530 is a communication interface with the network N.

The control unit 540 is a processor (i.e., control device) that controls each configuration of the entry control apparatus 500. The control unit 540 reads the program 511 from the storage unit 510 into the memory 520, and executes the program 511. As a result, the control unit 540 implements the functions of an application reception unit 541, a determination unit 542, a decision unit 543, a biometric information acquisition unit 544, a registration unit 545, an authentication control unit 546, an unlocking control unit 547, a calculation unit 548, and a notification unit 549.

The application reception unit 541 is an example of the application reception unit 11 described above. The application reception unit 541 receives, from the terminal 401, a usage application including a user ID of an applicant (applicant ID), a user name (or a user ID of a resident being a user), a region ID indicating a specific region, and a usage application period. In addition, in a case where the application reception unit 541 has received a registration destination request from the terminal 401, the application reception unit 541 returns destination information of the authentication apparatus 600 to the terminal as registration destination information.

The determination unit 542 determines whether or not the application is to be permitted, in accordance with an attribute of an applicant in an application. For example, the determination unit 542 identifies the attribute 5132 associated with an applicant ID (the user ID 5131), from the attribute information 513. Then, in a case where the identified attribute satisfies a predetermined condition, the determination unit 542 determines to permit the application. At this time, the determination unit 542 identifies (one or more) region IDs 5141 associated with the identified attribute (the attribute 5142), from the region definition information 514. Then, in a case where a region ID of a specific region targeted in the application is included in the identified region IDs 5141, the determination unit 542 may determine to permit the application.

For example, in a case where an applicant is a minor, the determination unit 542 may limit a region for which the application is permitted, as compared with a case where an applicant is an adult. That is, in a case where an attribute of an applicant is a second attribute with authority weaker than that of a first attribute, the determination unit 542 may deny an application for a certain specific region. Alternatively, in a case where an attribute of an applicant indicates a resident of a residence with a relatively higher grade, the determination unit 542 may permit an application for a special common facility. In addition, the determination unit 542 may deny an application irrespective of an attribute of an applicant in a case where a user is a user other than residents.

In addition, the determination unit 542 may determine whether or not to permit the application, based on the application history 515 of an applicant. That is, the determination unit 542 may determine whether or not to permit the application, based on information associated with the applicant ID 5151 in the application history 515. For example, the determination unit 542 may calculate a usage frequency of a specific region from the accessible range 5123 of the application time and date 5152 and the usage application information 5153 associated with the applicant ID 5151, and may deny an application in a case where the usage frequency is equal to or larger than a predetermined number of times within a predetermined period. As a result, it is possible to prevent a specific common facility from being occupied by a part of residents, and provide a larger number of users with a chance to use common facilities. In addition, the determination unit 542 may make a determination using an attribute of an applicant and an application history in combination. For example, in a case where an attribute of an applicant indicates a minor, the determination unit 542 identifies a cohabiter (parent, adult) of the applicant. In a case where an application for a specific region targeted in the application has been permitted a predetermined number of times or more in the application history 515 associated with the applicant ID 5151 of the identified cohabiter, the determination unit 542 may permit the application. For example, in the case of a person (housekeeper or the like) permitted a number of times through applications made by a parent, a child can make an application for the person.

Furthermore, in a case where the determination unit 542 determines to permit an application in the above-described determination, the determination unit determines whether or not a user related to the application is a legitimate user. Here, the determination unit 542 determines whether or not a user name targeted in the application is included in registration information (not illustrated) of pre-registered residents. Alternatively, in a case where a user ID is included as a user targeted in an application, the determination unit 542 determines whether or not the user ID is included in the attribute information 513.

The decision unit 543 decides an accessible range based on an attribute of an applicant of an application. For example, the decision unit 543 refers to the region definition information 514, identifies one or more region IDs 5141 associated with the attribute 5142 of the applicant, and decides the identified one or more region IDs as an accessible range. Alternatively, the decision unit 543 may decide an accessible range based on information designated from the terminal 401. Alternatively, the decision unit 543 identifies each region through which a user passes before reaching a specific region from a gateway of the complex housing 700, using arrangement information (not illustrated) of each region of the complex housing 700, and decides a set of identified regions as an accessible range. Alternatively, the decision unit 543 may decide an accessible range based on all of an attribute of an applicant, designated information, and arrangement information.

The biometric information acquisition unit 544 is an example of the biometric information acquisition unit 12 described above. In a case where a user targeted in an application is a user other than a legitimate user, the biometric information acquisition unit 544 acquires a face image of the visitor U2 as biometric information for registration from the terminal 401 or the terminal 402 via the network N. The biometric information acquisition unit 544 transmits a face information registration request including the acquired face image, to the authentication apparatus 600 via the network N. Then, the biometric information acquisition unit 544 acquires a user ID issued for the visitor U2 of which face information has been registered, from the authentication apparatus 600, and outputs the user ID to the registration unit 545 as a user ID of a user.

Alternatively, in a case where a user targeted in an application is a user other than a legitimate user, the biometric information acquisition unit 544 acquires the registered face image of the visitor U2 and the issued user ID from the authentication apparatus 600 via the network N. In this case, the biometric information acquisition unit 544 transmits the face image and the user ID to the terminal 401 via the network N. Moreover, the biometric information acquisition unit 544 outputs the acquired user ID to the registration unit 545 as a user ID of a user.

In addition, the biometric information acquisition unit 544 acquires a face image included in a face authentication request, as biometric information from the authentication terminal 100 via the network N, and outputs the face image to the authentication control unit 546. Note that the face authentication request includes a region ID or a terminal ID, and an image capturing time of the face image.

The registration unit 545 is an example of the registration unit 13 described above. The registration unit 545 registers the user ID 5121 of the user, the usage application period 5122 required in the application, and the identified (decided) accessible range 5123 into the usage application information in association with each other. Here, the user may be the resident U1 or the visitor U2. Note that, as mentioned above, because the user ID 5121 corresponds to the user ID 611 in the face information DB 610, it means that the registration unit 545 stores a usage application period and an accessible range in association with biometric information of the user.

In addition, in a case where the application history 515 regarding a user satisfies a predetermined condition, the registration unit 545 registers an accessible range, a usage application period related to the application, and a user ID of the user that has already been registered in the storage unit 510, into the storage unit 510 as the usage application information 512 in association with each other. That is, it can also be said that, in a case where the application history satisfies the predetermined condition, the registration unit 545 reuses registered biometric information. Thus, in a case where the registration unit 545 reuses registered biometric information, acquisition of biometric information for registration is not performed by the biometric information acquisition unit 544. On the other hand, in a case where the application history 515 does not satisfy the predetermined condition, the registration unit 545 transmits registration destination information of biometric information to the terminal 401.

Here, the predetermined condition may be a condition specifying that the number of registration times of a user is equal to or larger than a predetermined number of times, or a condition specifying that a registration frequency is equal to or larger than a predetermined number of times within a predetermined period, for example. In this case, the registration unit 545 refers to the application history 515 and calculates the number of registration times and a registration frequency of a user targeted in the application (the user ID 5121 in the usage application information 5153), and then determines whether or not the predetermined condition is satisfied.

The authentication control unit 546 is an example of the authentication control unit 14 described above. The authentication control unit 546 controls face authentication of a face region of a user (the resident U1, or the visitor U2, or the like) that is included in a face image received from the biometric information acquisition unit 544. More specifically, the authentication control unit 546 causes the authentication apparatus 600 to perform face authentication of the face image. For example, the authentication control unit 546 transmits a face authentication request including the acquired captured image, to the authentication apparatus 600 via the network N, and receives a face authentication result from the authentication apparatus 600. Note that the authentication control unit 546 may detect a face region of a user from the face image and include an image of the face region in the face authentication request. Alternatively, the authentication control unit 546 may extract face feature information from the face region and include the face feature information in the face authentication request. The authentication control unit 546 acquires a face authentication result from the authentication apparatus 600 via the network N, and outputs the face authentication result to the unlocking control unit 547.

The unlocking control unit 547 is an example of the unlocking control unit described above. In a case where the following three conditions are satisfied, the unlocking control unit 547 transmits an unlocking instruction to the authentication terminal 100 that has issued the face authentication request, via the network N. The first condition specifies that the face authentication described above succeeds. In this case, the unlocking control unit 547 identifies a user ID included in the face authentication result received from the authentication control unit 546. Then, the unlocking control unit 547 identifies, from among the usage application information 512, the usage application period 5122 and the accessible range 5123 associated with the identified user ID 5121. The second condition specifies that a predetermined region is included in an accessible range associated with biometric information of which biometric authentication has succeeded. Here, a user ID included in the face authentication result is associated with face feature information of which face authentication has succeeded. Thus, the "accessible range associated with biometric information of which biometric authentication has succeeded" refers to the above-described identified accessible range. Accordingly, the unlocking control unit 547 determines whether or not the identified accessible range includes a region with a region ID included in the face authentication request. The third condition specifies that an acquisition time of biometric information is included in a range of a predetermined period including a usage application period associated with biometric information of which biometric authentication has succeeded. The "usage application period associated with biometric information of which biometric authentication has succeeded" is the above-described identified usage application period for the above-described similar reason. In addition, the predetermined period may be a period from 15 minutes before a start time of the usage application period to 15 minutes after an end time of the usage application period, for example. In addition, the "acquisition time of biometric information" is an image capturing time included in the face authentication request. Accordingly, the unlocking control unit 547 determines whether or not an image capturing time is included in a range of a predetermined period including the identified usage application period.

Figure 8:
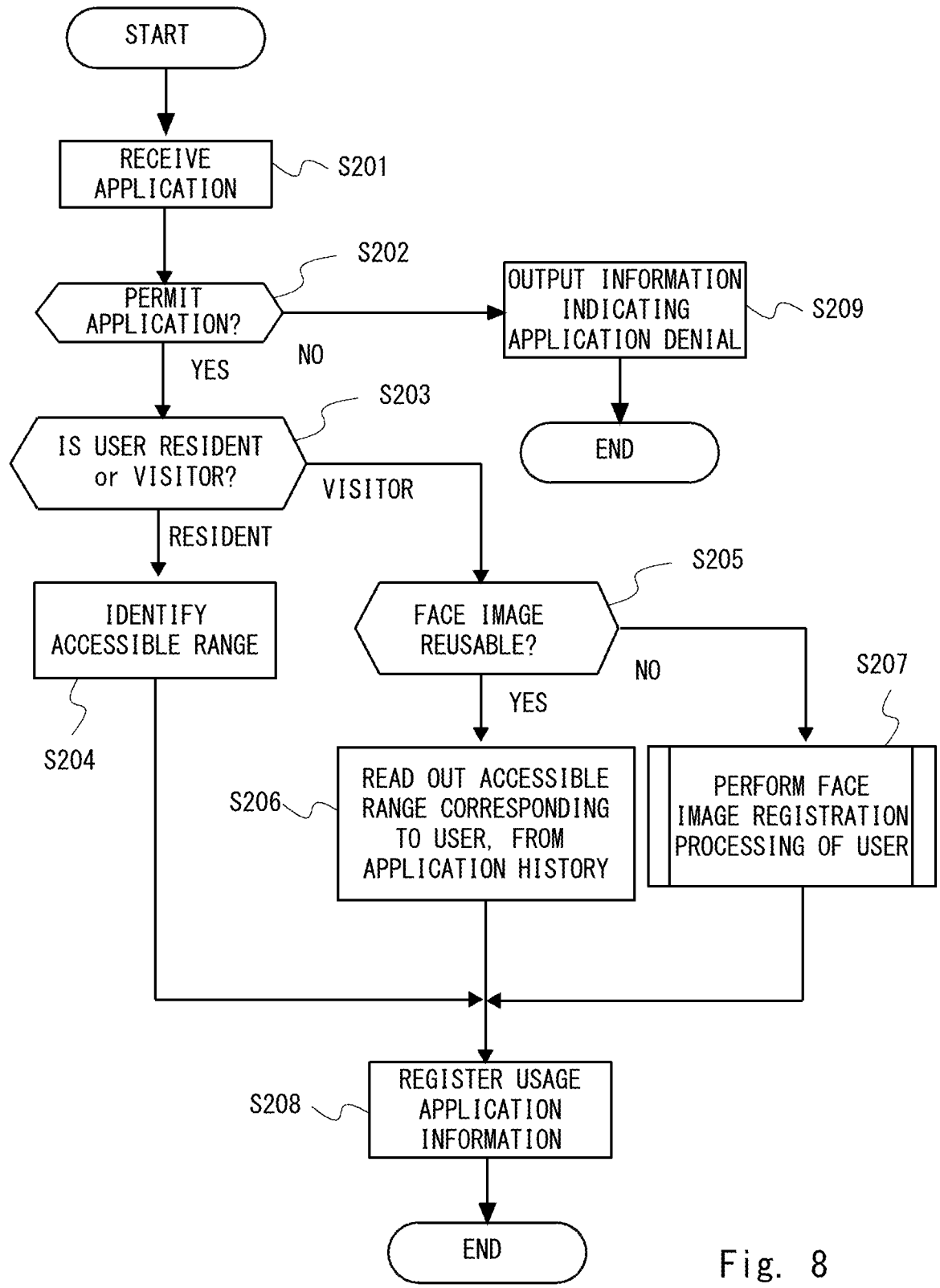
FIG. 8 is a flowchart illustrating a flow of usage application processing according to the second example embodiment.

FIG. 8 is a flowchart illustrating a flow of usage application processing according to the second example embodiment. Here, the resident U1 is assumed to make a usage application for the visitor U2 using the region 300-*n*. First of all, the terminal 401 transmits, to the entry control apparatus 500 via the network N, a usage application including a user name entered by the resident U1 (name of the visitor U2), a specific region (region ID of the region 300-*n*), and a usage application period. Note that the terminal 401 includes a user ID of the resident U1 who has logged into (a usage application making application, or the like of) the terminal 401, into the usage application as an applicant ID. In addition, in a case where an application target user has ever made an application several times in the past, and the terminal 401 holds a user ID, the terminal 401 may further include the user ID in the usage application. Accordingly, the application reception unit 541 of the entry control apparatus 500 receives an application by receiving a usage application via the network N (S201).

Next, the determination unit 542 determines whether or not to permit the application (S202). Specifically, first of all, the determination unit 542 identifies the attribute 5132 associated with an applicant ID (the user ID 5131), from the attribute information 513. Then, the determination unit 542 determines whether or not the identified attribute satisfies the predetermined condition described above. In a case where the identified attribute satisfies the predetermined condition, the determination unit 542 determines to permit the application. Alternatively, the determination unit 542 may determine whether or not to permit the application, based on the application history 515 of an applicant.

In a case where it is determined in Step S202 that the application is not to be permitted, the determination unit 542 outputs information indicating the application denial (S209). For example, the entry control apparatus 500 transmits a message indicating application denial, to the terminal 401 via the network N.

On the other hand, in a case where it is determined in Step S202 that the application is to be permitted, the determination unit 542 determines whether a user related to the application is a resident or a visitor (S203). For example, in a case where a user ID of a resident is designated as a user ID of a user related to the application, the determination unit 542 determines that the user is a resident. On the other hand, in a case where only a user name is designation as a name of a user related to the application, the determination unit 542 determines that the user is a visitor. In a case where it is determined that the user is a resident, the decision unit 543 identifies an accessible range of the user (S204). For example, the decision unit 543 may identify an accessible range of a user based on an attribute of the resident U1 and the arrangement information described above.

In a case where it is determined in Step S203 that the user is a visitor, the registration unit 545 determines whether or not a face image of the user is reusable (S205). Specifically, first of all, the registration unit 545 determines whether or not a user ID can be identified, and determines whether or not the application history 515 regarding the user satisfies the predetermined condition. For example, the registration unit 545 searches the application history 515 for a user name included in the usage application, and in a case where the user name is discovered, the registration unit 545 identifies a user ID (user ID) corresponding to the user name. At this time, if the user name has not been discovered from the application history 515, the registration unit 545 determines that the face image of the user is not reusable. Alternatively, in a case where the usage application includes a user ID, the registration unit 545 identifies the user ID from the usage application.

Then, the registration unit 545 performs statistical processing based on the application time and date 5152 and the usage application information 5153 that correspond to the identified user ID, from among the application history 515, and calculates the number of registration times or a registration frequency of a user, for example. Then, for example, in a case where the number of registration times or a registration frequency of the user is equal to or larger than a predetermined number of times, the registration unit 545 determines that the predetermined condition is satisfied and a face image of the user is reusable. Furthermore, in a case where an accessible range associated with the identified user ID includes a specific region targeted in the application, in the application history 515, the registration unit 545 may determine that the predetermined condition is satisfied and a face image of the user is reusable. On the other hand, in a case where the predetermined condition is not satisfied, the registration unit 545 determines that a face image of the user is not reusable.

In a case where it is determined in Step S205 that the face image is reusable, the registration unit 545 reads out the identified user ID and an accessible range including a region ID included in this usage application, from the application history 515 (S206).

In a case where it is determined in Step S205 that the face image is not reusable, the entry control apparatus 500 performs face image registration processing of the user (S207).

Figure 9:
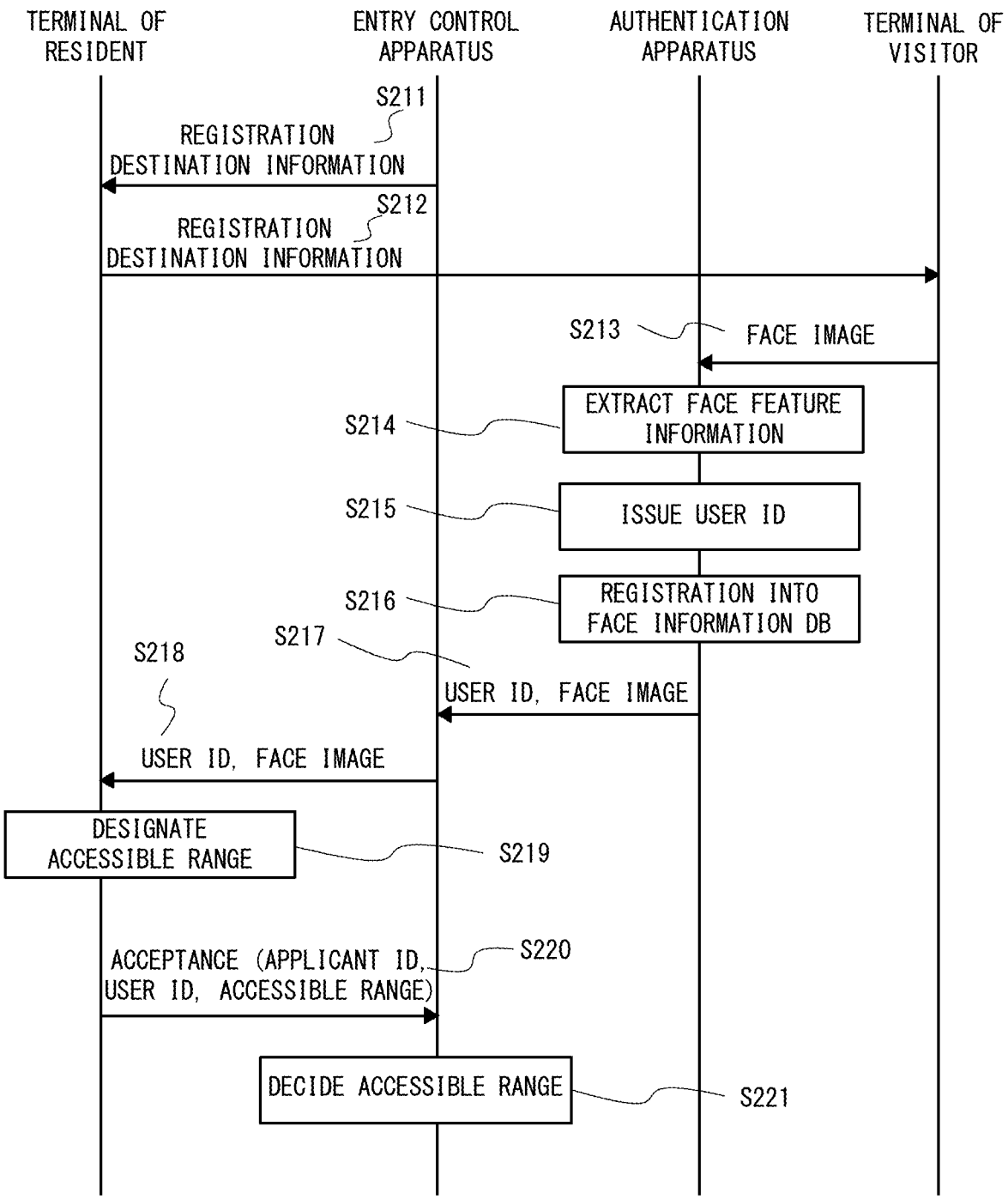
FIG. 9 is a sequence diagram illustrating a flow of face image registration processing of a visitor according to the second example embodiment.

FIG. 9 is a sequence diagram illustrating a flow of face image registration processing of a visitor according to the second example embodiment. First of all, the registration unit 545 transmits registration destination information of biometric information to the terminal 401 via the network N (S211). The registration destination information is a URL of the authentication apparatus 600, for example. Accordingly, the terminal 401 transmits the received registration destination information to the terminal 402 of the visitor U2 via the network N (S212).

Then, the terminal 402 accesses the authentication apparatus 600 via the network N based on the received registration destination information, and transmits a face image of the visitor U2 (S213). The face detection unit 620 of the authentication apparatus 600 detects a face region from the received face image. Then, the feature point extraction unit 630 extracts face feature information from the detected face region (S214). Then, the registration unit issues a new user ID (S215). Here, it can be said that the issued user ID corresponds to the visitor U2. Then, the registration unit 640 registers the issued user ID 611 and the extracted face feature information 612 in association with each other into the face information DB 610 (S216). After that, the registration unit 640 transmits the user ID issued in Step S215, and the received face image, to the entry control apparatus 500 via the network N (S217).

Then, the biometric information acquisition unit 544 of the entry control apparatus 500 receives the user ID and the face image from the authentication apparatus 600 via the network N. Then, the biometric information acquisition unit 544 transmits the received user ID and the face image to the terminal 401 via the network N (S218). Accordingly, the terminal 401 receives the user ID and the face image from the entry control apparatus 500 via the network N.

For example, the terminal 401 displays the received face image on a screen. As a result, the resident U1 can confirm that the face image of the visitor U2 being a user targeted in the usage application has been registered. Subsequently, the terminal 401 receives the designation of an accessible range of the visitor U2 based on an entry made by the resident U1 (S219). In addition, the terminal 401 receives the registration of the face image of the visitor U2 and the acceptance (confirmation) of the usage application based on an entry made by the resident U1. Then, the terminal 401 transmits information indicating the acceptance, including the received user ID as a user ID, an applicant ID of the resident U1, a user ID, and the designated accessible range, to the entry control apparatus 500 via the network N (S220).

Accordingly, the registration unit 545 of the entry control apparatus 500 receives information indicating the acceptance, from the terminal 401 via the network N. Then, the decision unit 543 decides an accessible range of the user based on an accessible range included in the received information, and an attribute or the like of an applicant (S221). Here, for example, a set of region IDs of the regions 300-1, 300-2, . . . , and 300-n is decided as an accessible range.

Returning to FIG. 8, the description will be continued. After Step S204, S206, or S207, the registration unit 545 registers usage application information (S208). In a case where the processing proceeds to Step S208 after Step S204, the registration unit 545 stores the identified accessible range, the user ID (resident), and the usage application period into the storage unit 510 in association with each other as the usage application information 512. In a case where the processing proceeds to Step S208 after Step S206, the registration unit 545 stores the read-out accessible range, the user ID (visitor), and the usage application period into the storage unit 510 in association with each other as the usage application information 512. That is, in this case, the acquisition (registration) of biometric information of the visitor U2 is not performed, and registration is performed using the same user ID 5121 as the user ID 611 registered in the face information DB 610. Thus, it can be said that the face feature information 612 of the visitor U2 that has already been registered in the face information DB 610 is reused. In a case where the processing proceeds to Step S208 after Step S207, the registration unit 545 stores the decided accessible range, the user ID (visitor), and the usage application period into the storage unit 510 in association with each other as the usage application information 512.

Figure 10:
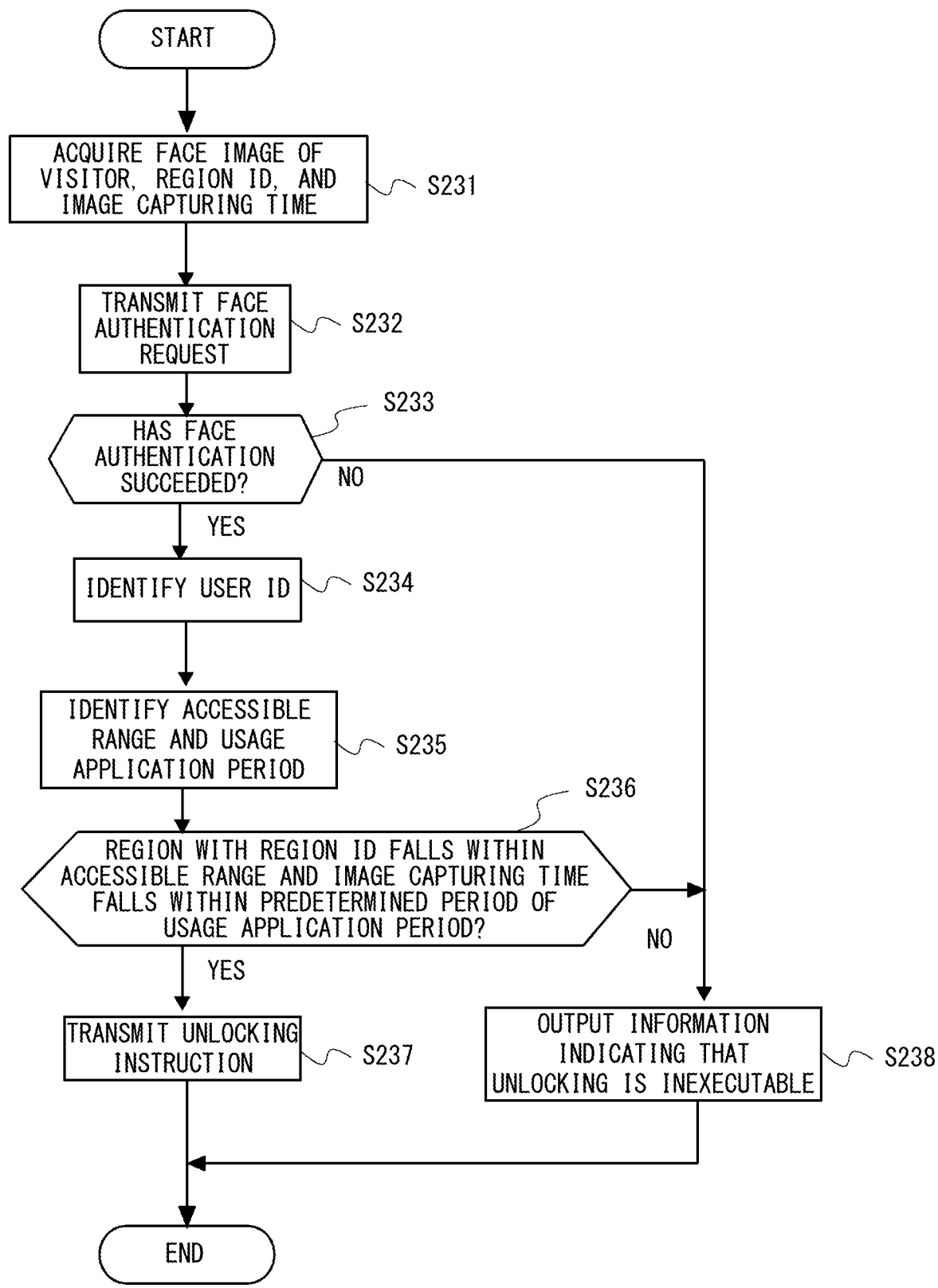
FIG. 10 is a flowchart illustrating a flow of unlocking processing according to the second example embodiment.

FIG. 10 is a flowchart illustrating a flow of unlocking processing according to the second example embodiment. Here, it is assumed that the usage application processing illustrated in FIG. 9 has already been executed. First of all, the visitor U2 is assumed to have arrived at the gateway of the region 300-1 of the complex housing 700. Here, the authentication terminal 100-1 captures a face image of the visitor U2. Then, the authentication terminal 100-1 transmits a face authentication request including the captured face image, a region ID of the region 300-1, and an image capturing time, to the entry control apparatus 500 via the network N. Accordingly, the biometric information acquisition unit 544 of the entry control apparatus 500 acquires a face image included in a face authentication request, as biometric information from the authentication terminal via the network N (S231), and outputs the face image to the authentication control unit 546.

Then, the authentication control unit 546 transmits the acquired face authentication request including the face image, to the authentication apparatus 600 via the network N (S232). The authentication apparatus 600 receives the face authentication request from the entry control apparatus 500 via the network N, and performs face authentication processing based on the face image included the face authentication request. Specifically, the face detection unit 620 detects a face region from the face image. Then, the feature point extraction unit 630 extracts face feature information from the face region. Then, the authentication unit 650 collates the extracted face feature information with the face feature information 612 in the face information DB 610. In a case where the pieces of face feature information match each other, that is, the degree of matching between the pieces of face feature information is equal to or higher than a predetermined value, the authentication unit 650 identifies the user ID 611 of the user whose face feature information matches, and generates a face authentication result including information indicating a success in face authentication, and the identified user ID. On the other hand, in a case where there is no matching face feature information, the authentication unit 650 generates a face authentication result including information indicating a failure in face authentication. After that, the authentication unit 650 transmits the generated face authentication result to the entry control apparatus 500 via the network N.

Accordingly, the authentication control unit 546 of the entry control apparatus 500 receives the face authentication result from the authentication apparatus 600 via the network N, and outputs the face authentication result to the unlocking control unit 547. Then, the unlocking control unit 547 determines whether or not face authentication has succeeded (first condition), based on the face authentication result (S233). In a case where it is determined that face authentication has succeeded, the unlocking control unit 547 identifies a user ID included in the face authentication result (S234). Then, the unlocking control unit 547 identifies, from among the usage application information 512, the usage application period 5122 and the accessible range 5123 associated with the identified user ID 5121.

Subsequently, the unlocking control unit 547 determines whether or not the second condition and the third condition described above are satisfied (S236). More specifically, as for the second condition, the unlocking control unit 547 determines whether or not a region with the region ID acquired in Step S231 falls within the accessible range identified in Step S235. In addition, as for the third condition, the unlocking control unit 547 determines whether or not the image capturing time acquired in Step S231 falls within a range of a predetermined period including the usage application period identified in Step S235.

In a case where it is determined in Step S236 that the second condition and the third condition are satisfied, the unlocking control unit 547 transmits an unlocking instruction via the network N to the authentication terminal 100-1 installed in a region corresponding to the region ID acquired in Step S231 (S237). In other words, the unlocking control unit 547 issues an unlocking instruction to the authentication terminal 100-1 being a request source of the face authentication request. Accordingly, the locking control unit 155 of the authentication terminal 100-1 receives an unlocking instruction from the entry control apparatus 500 via the network N, and outputs the unlocking instruction to the gate device 200-1. Then, the gate device 200-1 unlocks a gate in accordance with the received unlocking instruction. As a result, the visitor U2 can enter the region 300-1.

In a case where it is determined in Step S233 that face authentication has failed, or in a case where it is determined in Step S236 that at least either one of the second condition and the third condition is not satisfied, the unlocking control unit 547 transmits (outputs) information indicating that unlocking is inexecutable, to the authentication terminal 100-1 via the network N (S238).

Hereinafter, similarly, the visitor U2 performs face authentication with the authentication terminal 100-2, and the gate device 200-2 is unlocked by the entry control apparatus 500 and the authentication terminal 100-2, whereby the visitor U2 can enter the region 300-2. Then, the visitor U2 performs face authentication with the authentication terminal 100-n, and the gate device 200-n is unlocked by the entry control apparatus 500 and the authentication terminal 100-n, whereby the visitor U2 can enter the region 300-n.

Figure 11:
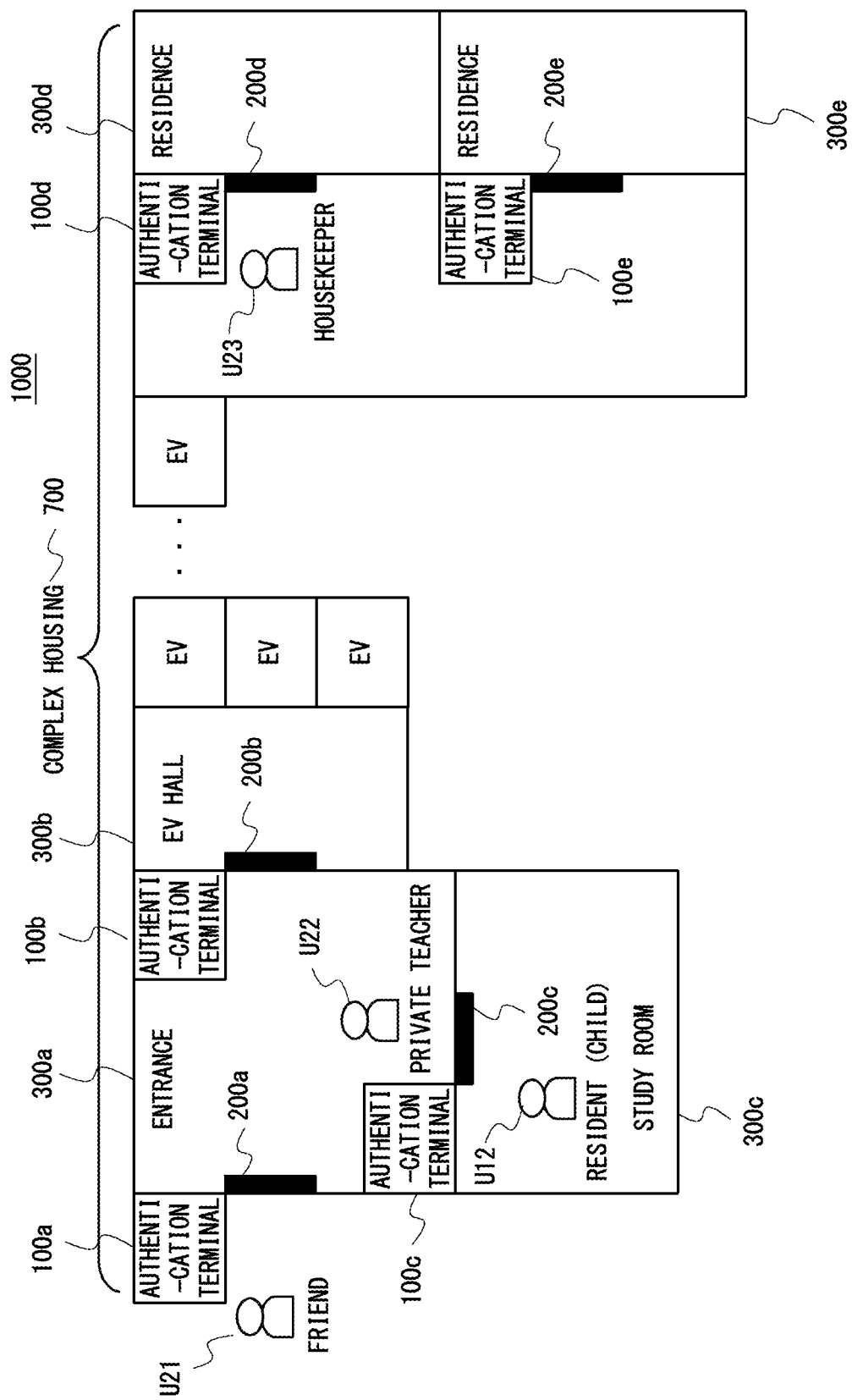
FIG. 11 is a block diagram illustrating a part of an internal configuration of a complex housing according to the second example embodiment.

FIG. 11 is a block diagram illustrating a part of an internal configuration of the complex housing 700 according to the second example embodiment. The complex housing 700 includes, for example, the entrance 300a, the EV hall 300b, the study room 300c, the residence 300d, and a residence 300e as entry-restricted regions. The authentication terminal 100a and the gate device 200a are installed at a gateway of the entrance 300a. The entrance 300a, the EV hall 300b, and the study room 300c are adjacent to each other. Thus, the authentication terminal 100b and the gate device 200b installed at a gateway of the EV hall 300b are installed at the boundary between the entrance 300a and the EV hall 300b. In addition, the authentication terminal 100c and the gate device 200c installed at a gateway of the study room 300c are installed at the boundary between the entrance 300a and the study room 300c. In addition, one or more elevators (EVs) are installed in the EV hall 300b, and migration to a floor of the residences 300d and 300e is enabled by a certain elevator. The authentication terminal 100d and the gate device 200d are installed at a gateway of the residence 300d. In addition, the authentication terminal 100e and the gate device 200e are installed at a gateway of the residence 300e.

Here, the entry control apparatus 500 includes information similar to the information illustrated in FIG. 7, as the usage application information 512 included in a preliminarily-made usage application. In this case, the friend U21 can enter the entrance 300a because the gate device 200a is unlocked by face authentication executed by the authentication terminal 100a. However, because an accessible range of the friend U21 does not include another region other than the entrance 300a, the friend U21 fails in face authentication executed by the authentication terminal 100b or the authentication terminal 100c, and cannot enter the EV hall 300b and the study room 300c.

In addition, because an accessible range of the private teacher U22 includes the entrance 300a and the study room 300c, the private teacher U22 succeeds in face authentication executed by the authentication terminals 100a and 100c. Thus, the private teacher U22 can enter the study room 300c via the entrance 300a. However, because the private teacher U22 fails in face authentication executed by the authentication terminal 100b, the private teacher U22 cannot enter the EV hall 300b and the residences 300d and 300e.

In addition, because an accessible range of the housekeeper U23 includes the entrance 300a, the EV hall 300b, and the residence 300d, the housekeeper U23 succeeds in face authentication executed by the authentication terminals 100a, 100b, and 100d. Thus, the housekeeper U23 can enter the residence 300d via the entrance 300a and the EV hall 300b. However, the housekeeper U23 cannot enter the study room 300c and the residence 300e.

In this manner, in the present example embodiment, based on a specific region designated when a usage application is made, usage application information is registered while including each region through which a user passes before reaching the specific region from a gateway of a facility, into an accessible range. Note that, in Patent Literature 1 or 3 described above, a usage application needs to be made for each occupied space, which is bothersome. Thus, in the present example embodiment, reservation of a flexible usage range suitable for a user for a region can be performed.

In addition, in a case where a usage application for the same visitor is repeatedly made, credibility of the visitor is high, and a face image (face feature information) has already been registered. Accordingly, in such a case, reacquisition of a face image and reregistration of face feature information are omitted, and registration is performed while reusing (user ID associated with) registered biometric information. As a result, efficient and highly-convenient registration can be implemented.

In addition, in the present example embodiment, the satisfaction of the first condition, the second condition, and the third condition is used as a condition of unlocking. Thus, high security can be ensured.

In addition, in a case where a common facility such as a study room is used, a private teacher is summoned to the study room, and a child and the private teacher use the study room. In this case, a parent needs not pick the private teacher up at an entrance or the like, and burden on the parent is reduced. In addition, because only a pre-registered private teacher is allowed to enter the study room, high security can be ensured.

In addition, the entry control apparatus 500 may debit a usage fee from an account of an applicant as for the payment of a usage fee of a common facility for which a usage application has been made. In addition, in the present example embodiment, because there is no need to make a paper-based application or make a cash payment to a concierge (building manager), simplification of building manager operations and promotion of utilization of common facilities are consequently achieved.

Note that, as described with reference to FIG. 11, in a case where face authentication is performed at a plurality of points before a user reaches a specific region of which the usage has been applied for, a face image acquired when face authentication is performed for the first time, or face feature information (biometric information) of which authentication has succeeded may be used as a collation target to be used in the second or subsequent face authentication. For example, in a case where the housekeeper U23 performs face authentication using the authentication terminal 100b, a face image captured by the authentication terminal 100a at the entrance 300a may be used in collation. As a result, collation becomes one-to-one collation, and collation processing can become more efficient. At this time, to reuse a face image acquired at the time of the first face authentication, a reuse time limit such as within a predetermined time (for example, within five minutes) may be provided. Specifically, in a case where the unlocking control unit 547 outputs an unlocking instruction to the authentication terminal 100a at the entrance 300a, the unlocking control unit 547 holds a face image of which face authentication has succeeded, into the memory or the like, and starts a timer. Then, in a case where the authentication control unit 546 has received a face authentication request from the authentication terminal 100b at the EV hall 300b, the authentication control unit 546 determines whether a time counted by the timer falls within a predetermined time. In a case where the time falls within the predetermined time, the authentication control unit performs face authentication by collating a face image included in a face authentication request, with the face image held in the memory 520. That is, in a case where the time falls within the predetermined time, the authentication control unit 546 performs one-to-one authentication. At this time, the authentication control unit 546 omits face authentication executed using the authentication apparatus 600. On the other hand, in a case where the counted time exceeds the predetermined time, the authentication control unit 546 performs face authentication (one-to-N authentication) using the authentication apparatus as usual. Note that the predetermined time may be changed in accordance with a utilization purpose or an intended location.

Third Example Embodiment

A third example embodiment is a modification of the second example embodiment described above. The third example embodiment incorporates a biometric authentication function into an entry control apparatus. Because an entry control system according to the third example embodiment is similar to the entry control system 1000 described above, in which the authentication apparatus 600 is incorporated into an entry control apparatus 500a, the illustration and description will be omitted.

Figure 12:
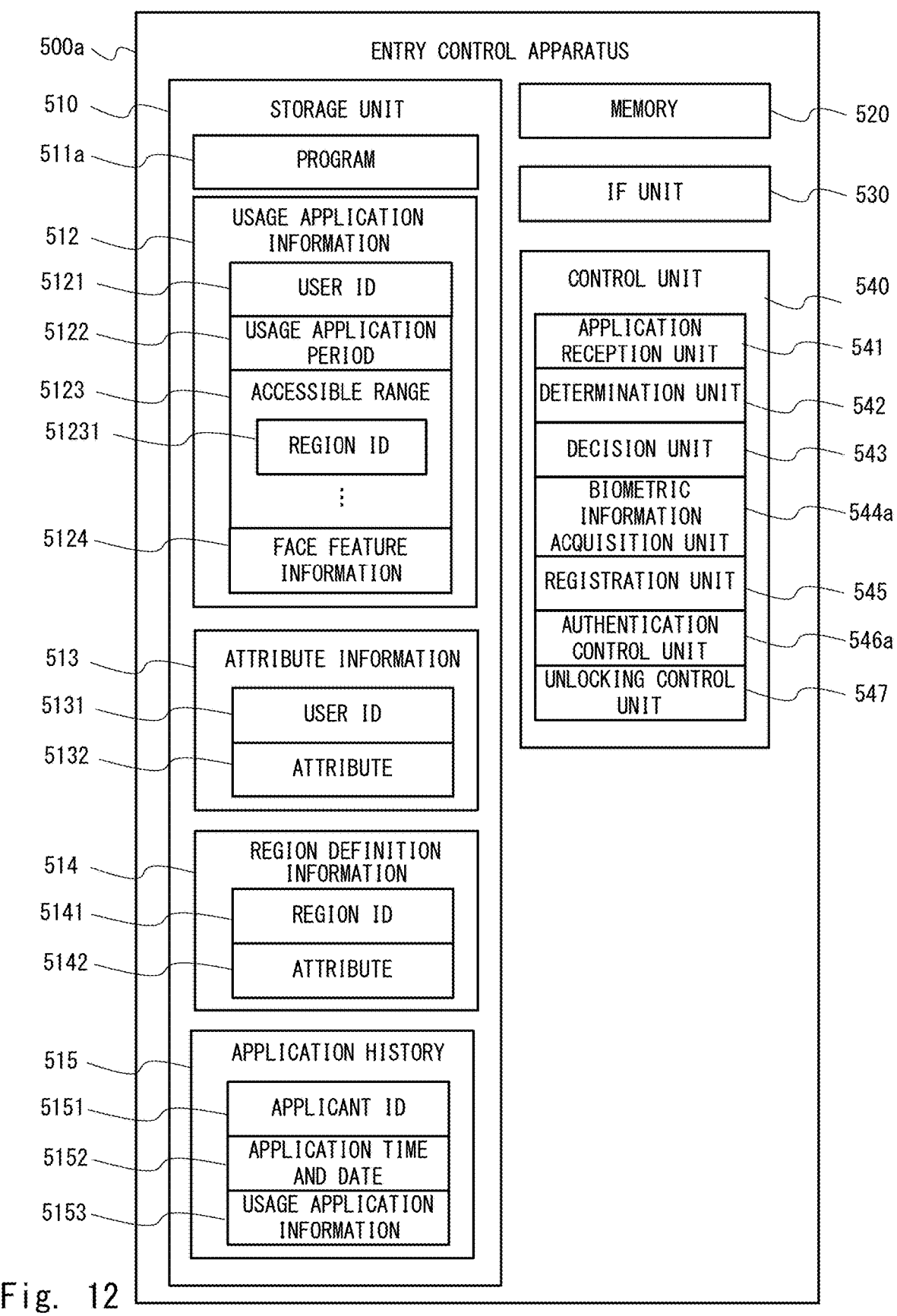
FIG. 12 is a block diagram illustrating a configuration of an entry control apparatus according to a third example embodiment.

FIG. 12 is a block diagram illustrating a configuration of the entry control apparatus 500a according to the third example embodiment. In the storage unit 510 of the entry control apparatus 500a, as compared with that in the entry control apparatus 500 described above, the program 511 is replaced with a program 511a, and face feature information 5124 is added to the usage application information 512. Note that the face feature information 5124 is an example of biometric information. In addition, in a control unit 540 of the entry control apparatus 500a, as compared with that in the entry control apparatus 500 described above, the biometric information acquisition unit 544 and the authentication control unit 546 are replaced with a biometric information acquisition unit 544a and an authentication control unit 546a.

The program 511a is a computer program in which the processing of a recommendation method according to the third example embodiment is implemented.

The face feature information 5124 corresponds to the face feature information 612 of the authentication apparatus 600 described above. The face feature information 5124 is associated with the user ID 5121. That is, the usage application information 512 encompasses the face information DB 610 described above.

In a case where a user targeted in an application is a user other than a legitimate user, the biometric information acquisition unit 544a acquires a face image of the visitor U2 as biometric information for registration from the terminal 401 or the terminal 402 via the network N. In addition, the biometric information acquisition unit 544a outputs a face information registration request including the acquired face image, to the authentication control unit 546a.

The authentication control unit 546a controls face authentication by collating face feature information of the visitor U2 with face feature information of a plurality of persons. More specifically, the authentication control unit 546a collates face feature information extracted from a face region of a user included in an acquired face image, with the face feature information 5124 stored in the storage unit 510, to perform face authentication, thereby acquiring a face authentication result.

Note that, in the present example embodiment, Step 232 of FIG. 10 described above is replaced with face authentication processing in the entry control apparatus 500a that is executed by the authentication control unit 546a.

As described above, the same effects as those of the second example embodiment described above can be achieved by the third example embodiment.

Other Example Embodiments

Note that, the biometric authentication described above has been described as face authentication (single modal) in principle, but face authentication+iris authentication (multimodal) may be used for a door of a residence or payment that requires higher security. In this case, an authentication terminal includes an infrared camera in addition to the camera 110.

The entry control apparatuses 500 and 500a described above (hereinafter, the entry control apparatus 500 or the like) may include a calculation unit that calculates, in a case where a user is a user other than a legitimate user, a score that is based on the number of registration times or a registration frequency of the user. Specifically, the calculation unit calculates the number of registration times of the user or a registration frequency within a predetermined period based on the usage application information 5153 including a user ID of the user in the application history 515, and the application time and date 5152 associated with the usage application information 5153. Then, the calculation unit performs predetermined calculation on the calculated number of registration times or a registration frequency, and calculates the obtained value as a score. Note that the calculation unit may store the calculated score into the storage unit 510 in association with the user ID of the user. In this case, in a case where a score of the user targeted in the application is equal to or higher than a predetermined value, the registration unit 545 described above may determine that the predetermined condition is satisfied. That is, in a case where the score satisfies the predetermined condition, the registration unit 545 may determine to reuse biometric information of the user that has been registered in the past.

Note that, the application may further include usage at a predetermined interval. In this case, the registration unit 545 identifies a plurality of usage application periods corresponding to the predetermined interval, and registers an accessible range and biometric information into the storage unit 510 in association with each other for each of the identified usage application periods. In addition, for example, as for a regular visitor such as a housekeeper, an application may be made in conjunction with a visit schedule. In this case, because it is sufficient that the registration of a face image is performed only in the first time, efficiency and high convenience can be achieved.

The entry control apparatus 500 or the like may include a notification unit that notifies, in accordance with an attribute of an applicant, a terminal (not illustrated) of a cohabiter of the applicant of content of the application. Specifically, the notification unit identifies the attribute 5132 associated with an applicant ID (the user ID 5131), from the attribute information 513, and identifies a user ID of a cohabiter of the applicant from the identified attribute 5132. Then, the notification unit identifies destination information of the terminal of the cohabiter of the applicant from pre-registered personal information of residents of the complex housing 700. Then, the notification unit transmits the application content to a destination indicated by the identified destination information, via the network N. For example, in a case where a certain minor being a resident of a certain residence makes a usage application for a specific common facility a predetermined number of times or more within a predetermined period, information indicating the application may be reported to a terminal of parents of the minor.

Note that, a user who exits from a common facility may be authenticated, and a usage status (vacancy status) of the common facility may be managed. In this case, in a case where a predetermined region for which an unlocking instruction has been issued is a specific region, the unlocking control unit 547 adds the number of people who use the specific region. Then, the authentication control unit 546 controls second biometric authentication on biometric information acquired when a user exits from the specific region. Then, in a case where the second biometric authentication has succeeded, the unlocking control unit 547 issues an unlocking instruction to a locking system (authentication terminal) installed at a gateway of the specific region, and reduces the number of people who use the specific region. In this manner, by identifying a person who exists, a usage status (vacancy status) of a common facility can be managed.

Note that, in a case where a visitor is authenticated by an authentication terminal (for example, digital signage) installed at an entrance, and a common facility planned to be used by the visitor is occupied based on another usage application (or in a case where a visitor has arrived early), guidance for a waiting location, a waiting time, or the like may be provided. In this case, in a case where an acquisition time of biometric information is earlier than a predetermined period including a usage application period, the unlocking control unit 547 desirably identifies a waiting region, and notifies a terminal from which the biometric information has been acquired, of the waiting region.

In addition, the terminal 401 of the resident U1 may receive a notification indicating that a pre-registered person has entered the complex housing 700, from the entry control apparatus 500 or the like, and at the time, the terminal 401 may make a usage application while designating an accessible range of the person in real time.

Note that, although the hardware configuration has been described in the above-described example embodiments, the present disclosure is not limited thereto. According to the present disclosure, arbitrary processing can also be implemented by causing a CPU to execute a computer program.

In the above example, the program can be stored using various types of non-transitory computer-readable media and supplied to a computer. The non-transitory computer-readable media include various types of tangible storage media. Examples of the non-transitory computer-readable medium include a magnetic recording medium (for example, a flexible disk, a magnetic tape, or a hard disk drive), an optical magnetic recording medium (for example, a magneto-optical disk), a compact disc-read only memory (CD-ROM), a CD-R, a CD-R/W, a digital versatile disc (DVD), and a semiconductor memory such as a mask ROM, a programmable ROM (PROM), an erasable PROM (EPROM), a flash ROM, or a random access memory (RAM). In addition, the program may be supplied to the computer by various types of transitory computer-readable media. Examples of the transitory computer-readable medium include an electric signal, an optical signal, and electromagnetic waves. The transitory computer-readable medium can provide the program to the computer via a wired communication line such as electric wires and optical fibers or a wireless communication line.

Note that the present disclosure is not limited to the above example embodiments, and can be appropriately changed without departing from the gist. Furthermore, the present disclosure may be implemented by appropriately combining the respective example embodiments.

Some or all of the above example embodiments can be described as the following supplementary notes, but are not limited to the following.

(Supplementary Note A1)

An entry control apparatus including:
application reception means for receiving an application of a user who uses a specific region, from a terminal of a legitimate user of a facility including a plurality of regions into which entry is restricted in each of a plurality of locking systems;
biometric information acquisition means for acquiring biometric information of the user in a case where the user is a user other than the legitimate user;
registration means for registering an accessible range including regions included in a route from a gateway of the facility to the specific region, and biometric information of the user into a storage device in association with each other;
authentication control means for controlling first biometric authentication of biometric information acquired from the user at a gateway of a predetermined region, with biometric information registered in the storage device; and
unlocking control means for issuing, in a case where the first biometric authentication has succeeded, and the predetermined region is included in the accessible range associated with biometric information of which the first biometric authentication has succeeded, an unlocking instruction to the locking system installed at the gateway of the predetermined region.

(Supplementary Note A2)

The entry control apparatus according to Supplementary Note A1, wherein
the application further includes a usage application period,
the registration means further registers the usage application period into the storage device in association with the accessible range and the biometric information, and
in a case where an acquisition time of the biometric information is included in a range of a predetermined period including the usage application period associated with biometric information of which the first biometric authentication has succeeded, the unlocking control means issues the unlocking instruction.

(Supplementary Note A3)

The entry control apparatus according to Supplementary Note A2, wherein, in a case where an application history regarding the user satisfies a predetermined condition as for the application, the registration means registers the accessible range, a usage application period related to the application, and biometric information of the user that has already been registered in the storage device, into the storage device in association with each other.

(Supplementary Note A4)

The entry control apparatus according to Supplementary Note A3, further including calculation means for calculating, in a case where the user is a user other than the legitimate user, a score that is based on the number of registration times or a registration frequency of the user,
wherein, in a case where the score is equal to or higher than a predetermined value, the registration means determines that the predetermined condition is satisfied.

(Supplementary Note A5)

The entry control apparatus according to Supplementary Note A2 or A3, wherein
the application further includes information indicating usage at a predetermined interval, and
the registration means identifies a plurality of the usage application periods corresponding to the predetermined interval, and registers the accessible range and the biometric information into the storage device in association with each other for each of the identified usage application periods.

(Supplementary Note A6)

The entry control apparatus according to any one of Supplementary Notes A1 to A5, further including determination means for determining whether or not to permit the application, in accordance with an attribute of an applicant of the application, wherein, in a case where the determination means determines to permit the application, the determination means determines whether or not the user related to the application is the legitimate user.

(Supplementary Note A7)

The entry control apparatus according to Supplementary Note A6, wherein the determination means determines whether or not to permit the application, further based on an application history made by the applicant.

(Supplementary Note A8)

The entry control apparatus according to Supplementary Note A6 or A7, further including notification means for notifying a terminal of a cohabiter of the applicant of content of the application in accordance with an attribute of the applicant.

(Supplementary Note A9)

The entry control apparatus according to any one of Supplementary Notes A1 to A8, further including decision means for deciding the accessible range based on an attribute of an applicant of the application, wherein the registration means registers the decided accessible range and biometric information of the user into the storage device in association with each other.

(Supplementary Note A10)

The entry control apparatus according to any one of Supplementary Notes A1 to A9, wherein
in a case where a predetermined region for which the unlocking instruction has been issued is the specific region, the unlocking control means adds the number of people who use the specific region,
the authentication control means controls second biometric authentication of biometric information acquired when the user exits from the specific region, and
in a case where the second biometric authentication has succeeded, the unlocking control means issues an unlocking instruction to the locking system installed at a gateway of the specific region, and reduces the number of people who use the specific region.

(Supplementary Note A11)

The entry control apparatus according to any one of Supplementary Notes A1 to A10, wherein, in a case where an acquisition time of the biometric information is earlier than a predetermined period including the usage application period, the unlocking control means identifies a waiting region and notifies a terminal from which the biometric information has been acquired, of the waiting region.

(Supplementary Note B1)

An entry control system including:
a plurality of locking systems installed at respective gateways of a plurality of regions, and configured to restrict entry;
a user terminal of a legitimate user of a facility including the plurality of regions; and
an entry control apparatus,
wherein the entry control apparatus includes
application reception means for receiving an application of a user who uses a specific region, from the user terminal,
biometric information acquisition means for acquiring biometric information of the user in a case where the user is a user other than the legitimate user,
registration means for registering an accessible range including regions included in a route from a gateway of the facility to the specific region, and biometric information of the user into a storage device in association with each other,
authentication control means for controlling first biometric authentication of biometric information acquired from the user by the locking system installed at a gateway of a predetermined region, with biometric information registered in the storage device, and
unlocking control means for issuing, in a case where the first biometric authentication has succeeded, and the predetermined region is included in the accessible range associated with biometric information of which the first biometric authentication has succeeded, an unlocking instruction to the locking system installed at the gateway of the predetermined region.

(Supplementary Note B2)

The entry control system according to Supplementary Note B1, wherein
the application further includes a usage application period,
the registration means further registers the usage application period into the storage device in association with the accessible range and the biometric information, and
in a case where an acquisition time of the biometric information is included in a range of a predetermined period including the usage application period associated with biometric information of which the first biometric authentication has succeeded, the unlocking control means issues the unlocking instruction.

(Supplementary Note C1)

An entry control method to be executed by a computer, the entry control method including:
receiving an application of a user who uses a specific region, from a terminal of a legitimate user of a facility including a plurality of regions into which entry is restricted in each of a plurality of locking systems;
acquiring biometric information of the user in a case where the user is a user other than the legitimate user;
registering an accessible range including regions included in a route from a gateway of the facility to the specific region, and biometric information of the user into a storage device in association with each other;
controlling first biometric authentication of biometric information acquired from the user at a gateway of a predetermined region, with biometric information registered in the storage device; and
issuing, in a case where the first biometric authentication has succeeded, and the predetermined region is included in the accessible range associated with biometric information of which the first biometric authentication has succeeded, an unlocking instruction to the locking system installed at the gateway of the predetermined region.

(Supplementary Note D1)

A non-transitory computer-readable medium storing an entry control program for causing a computer to execute:
application reception processing of receiving an application of a user who uses a specific region, from a terminal of a legitimate user of a facility including a plurality of regions into which entry is restricted in each of a plurality of locking systems;
biometric information acquisition processing of acquiring biometric information of the user in a case where the user is a user other than the legitimate user;
registration processing of registering an accessible range including regions included in a route from a gateway of the facility to the specific region, and biometric information of the user into a storage device in association with each other;

authentication control processing of controlling first biometric authentication of biometric information acquired from the user at a gateway of a predetermined region, with biometric information registered in the storage device; and unlocking control processing of issuing, in a case where the first biometric authentication has succeeded, and the predetermined region is included in the accessible range associated with biometric information of which the first biometric authentication has succeeded, an unlocking instruction to the locking system installed at the gateway of the predetermined region.

Although the present invention has been described with reference to the example embodiments (and examples), the present invention is not limited to the above example embodiments (and examples). Various modifications that can be understood by those skilled in the art can be made to the configuration and details of the present invention within the scope of the present invention.

REFERENCE SIGNS LIST

1 ENTRY CONTROL APPARATUS
11 APPLICATION RECEPTION UNIT
12 BIOMETRIC INFORMATION ACQUISITION UNIT
13 REGISTRATION UNIT
14 AUTHENTICATION CONTROL UNIT
15 UNLOCKING CONTROL UNIT
1000 ENTRY CONTROL SYSTEM
100 AUTHENTICATION TERMINAL
110 CAMERA
120 STORAGE UNIT
130 COMMUNICATION UNIT
140 INPUT-OUTPUT UNIT
150 CONTROL UNIT
151 IMAGING CONTROL UNIT
152 REGISTRATION UNIT
153 AUTHENTICATION CONTROL UNIT
154 DISPLAY CONTROL UNIT
155 LOCKING CONTROL UNIT
100-1 to 100-n, 100a to 100e AUTHENTICATION TERMINAL
200 GATE DEVICE
200-1 to 200-n, 200a to 200e GATE DEVICE
300 REGION
300a ENTRANCE
300b EV HALL
300c STUDY ROOM
300d RESIDENCE
300e RESIDENCE
300-1 to 300-n REGION
401 TERMINAL
402 TERMINAL
500 ENTRY CONTROL APPARATUS
500a ENTRY CONTROL APPARATUS
510 STORAGE UNIT
511 PROGRAM
511a PROGRAM
512 USAGE APPLICATION INFORMATION
5121 USER ID
5122 USAGE APPLICATION PERIOD
5123 ACCESSIBLE RANGE
51231 REGION ID
5124 FACE FEATURE INFORMATION
513 ATTRIBUTE INFORMATION
5131 USER ID
5132 ATTRIBUTE
514 REGION DEFINITION INFORMATION
5141 REGION ID
5142 ATTRIBUTE
515 APPLICATION HISTORY
5151 APPLICANT ID
5152 APPLICATION TIME AND DATE
5153 USAGE APPLICATION INFORMATION
520 MEMORY
530 IF UNIT
540 CONTROL UNIT
541 APPLICATION RECEPTION UNIT
542 DETERMINATION UNIT
543 DECISION UNIT
544 BIOMETRIC INFORMATION ACQUISITION UNIT
544a BIOMETRIC INFORMATION ACQUISITION UNIT
545 REGISTRATION UNIT
546 AUTHENTICATION CONTROL UNIT
546a AUTHENTICATION CONTROL UNIT
547 UNLOCKING CONTROL UNIT
600 AUTHENTICATION APPARATUS
610 FACE INFORMATION DB
611 USER ID
612 FACE FEATURE INFORMATION
620 FACE DETECTION UNIT
630 FEATURE POINT EXTRACTION UNIT
640 REGISTRATION UNIT
650 AUTHENTICATION UNIT
700 COMPLEX HOUSING
N NETWORK
U1 RESIDENT
U12 RESIDENT (CHILD)
U2 VISITOR
U21 FRIEND
U22 PRIVATE TEACHER
U23 HOUSEKEEPER

The invention claimed is:

1. An entry control apparatus comprising:
at least one storage device storing instructions; and
at least one processor configured to execute the instructions to:
receive an application of a user who uses a specific region, from a terminal of a first user who is a legitimate user of a facility including a predetermined region into which entry is restricted;
in a case where the user is a second user other than the legitimate user, acquire biometric information of the second user from a terminal of the second user;
acquire the biometric information at a gateway of the predetermined region; and
issue, in a case where the predetermined region is included in an accessible range identified based on a collation result of acquired biometric information with the biometric information of the second user that has been registered in association with the accessible range including regions along a route from a gateway of the facility to the specific region, an instruction for a control system, which corresponds to the gateway of the predetermined region, to control permitting of the second user to pass through;
in a case where the predetermined region for which the instruction has been issued is the specific region, add the number of people who use the specific region;
control biometric authentication of the biometric information acquired when the legitimate user or the second user exits from the specific region; and in a case where the biometric authentication has succeeded, issue an unlocking instruction to the control system, which corresponds to a gateway of the specific region, and reduce the number of people who use the specific region.

2. The entry control apparatus according to claim 1, wherein
the at least one processor is further configured to execute the instructions to register the accessible range and the biometric information of the second user into the storage device in association with each other, based on the application,
the application further includes a usage application period, and
the at least one processor is further configured to execute the instructions to:
register the usage application period into the storage device in association with the accessible range and the biometric information; and
in a case where an acquisition time of the biometric information is included in a range of a predetermined period including the usage application period associated with the biometric information, issue the instruction to control permitting of the second user to pass through.

3. The entry control apparatus according to claim 2, wherein the at least one processor is further configured to execute the instructions to:
in a case where an application history regarding the second user satisfies a predetermined condition as for the application, register the accessible range, the usage application period related to the application, and the biometric information of the second user that has already been registered in the storage device, into the storage device in association with each other.

4. The entry control apparatus according to claim 3, wherein the at least one processor is further configured to execute the instructions to:
calculate, in a case where the user is the second user, a score that is based on the number of registration times or a registration frequency of the second user; and
in a case where the score is equal to or higher than a predetermined value, determine that the predetermined condition is satisfied.

5. The entry control apparatus according to claim 2, wherein
the application further includes information indicating usage at a predetermined interval, and
the at least one processor is further configured to execute the instructions to:
identify a plurality of the usage application periods corresponding to the predetermined interval, and register the accessible range and the biometric information into the storage device in association with each other for each of the identified usage application periods.

6. The entry control apparatus according to claim 1, wherein the at least one processor is further configured to execute the instructions to:
determine whether or not to permit the application, in accordance with an attribute of an applicant of the application; and
in a case where the application is permitted, determine whether or not the user related to the application is the legitimate user.

7. The entry control apparatus according to claim 6, wherein the at least one processor is further configured to execute the instructions to:
determine whether or not to permit the application, further based on an application history made by the applicant.

8. The entry control apparatus according to claim 6, wherein the at least one processor is further configured to execute the instructions to:
notify a terminal of a cohabiter of the applicant of content of the application in accordance with the attribute of the applicant.

9. The entry control apparatus according to claim 1, wherein the at least one processor is further configured to execute the instructions to:
decide the accessible range based on an attribute of an applicant of the application; and
register the decided accessible range and the biometric information of the second user into the storage device in association with each other.

10. The entry control apparatus according to claim 1, wherein the at least one processor is further configured to execute the instructions to:
in a case where an acquisition time of the biometric information is earlier than a predetermined period including the usage application period, identify a waiting region and notify a terminal from which the biometric information has been acquired, of the waiting region.

11. The entry control apparatus according to claim 1, wherein
the at least one processor is further configured to execute the instructions to:
transmit registration destination information of the biometric information to the terminal of the first user, in response to accepting the application; and
acquire the biometric information of the second user from the terminal of the second user which received the registration destination information from the terminal of the first user.

12. The entry control apparatus according to claim 1, wherein
the at least one processor is further configured to execute the instructions to:
register the accessible range and the biometric information of the second user into the storage device in association with each other, based on the application; and
notify, in a case where the biometric information of the second user is registered in the storage device, the terminal of the first user the registration.

13. An entry control system comprising:
a control system installed at a gateway of a predetermined region, and configured to restrict entry;
a user terminal of a user of a facility including the predetermined regions; and
an entry control apparatus,
wherein the entry control apparatus includes:
at least one storage device storing instructions; and
at least one processor configured to execute the instructions to:
receive an application of the user who uses a specific region, from the user terminal of a first user who is a legitimate user of a facility;
in a case where the user is a second user other than the legitimate user, acquire biometric information of the second user from a terminal of the second user;
acquire the biometric information at the gateway of the predetermined region;
issue, in a case where the predetermined region is included in an accessible range identified based on collation result of acquired biometric information with the biometric information of the second user registered in association with the accessible range including regions included in a route from a gateway of the facility to the specific region, an instruction for the control system, which corresponds to the gateway of the predetermined region, to control permitting of the second user to pass through;

in a case where the predetermined region for which the instruction has been issued is the specific region, add the number of people who use the specific region;

control biometric authentication of the biometric information acquired when the legitimate user or the second user exits from the specific region; and in a case where the biometric authentication has succeeded, issue an unlocking instruction to the control system, which corresponds to a gateway of the specific region, and reduce the number of people who use the specific region.

14. The entry control system according to claim 13, wherein the at least one processor is further configured to execute the instructions to register the accessible range and the biometric information of the second user into a storage device in association with each other, based on the application, the application further includes a usage application period, and the at least one processor is further configured to execute the instructions to:

register the usage application period into the storage device in association with the accessible range and the biometric information;

in a case where an acquisition time of the biometric information is included in a range of a predetermined period including the usage application period associated with the biometric information, issue the instruction to control permitting of the second user to pass through;

in a case where the predetermined region for which the instruction has been issued is the specific region, add the number of people who use the specific region;

control biometric authentication of the biometric information acquired when the legitimate user or the second user exits from the specific region; and in a case where the biometric authentication has succeeded, issue an unlocking instruction to the control system, which corresponds to a gateway of the specific region, and reduce the number of people who use the specific region.

15. An entry control method performed by a computer and comprising:

receiving an application of a user who uses a specific region, from a terminal of a user who is a legitimate user of a facility including a predetermined region into which entry is restricted;

in a case where the user is a second user other than the legitimate user, acquiring biometric information of the second user from a terminal of the second user;

acquiring the biometric information at a gateway of the predetermined region;

issuing, in a case where the predetermined region is included in an accessible range identified based on collation result of acquired biometric information with biometric information of the second user registered in association with the accessible range including regions included in a route from a gateway of the facility to the specific region, an instruction for a control system, which corresponds to the gateway of the predetermined region, to control permitting the second user to pass through;

in a case where the predetermined region for which the instruction has been issued is the specific region, adding the number of people who use the specific region;

controlling biometric authentication of the biometric information acquired when the legitimate user or the second user exits from the specific region; and in a case where the biometric authentication has succeeded, issuing an unlocking instruction to the control system, which corresponds to a gateway of the specific region, and reduce the number of people who use the specific region.

16. A non-transitory computer-readable medium storing an entry control program executable by a computer to perform processing comprising:

receiving an application of a user who uses a specific region, from a terminal of a user who is a legitimate user of a facility including a predetermined region into which entry is restricted;

in a case where the user is a second user other than the legitimate user, acquiring biometric information of the second user from a terminal of the second user;

acquiring the biometric information at a gateway of the predetermined region; and issuing, in a case where the predetermined region is included in an accessible range identified based on collation result of acquired biometric information with the biometric information of the second user registered in association with the accessible range including regions included in a route from a gateway of the facility to the specific region, an instruction for a control system, which corresponds to the gateway of the predetermined region, to control permitting of the second user to pass through;

in a case where the predetermined region for which the instruction has been issued is the specific region, add processing of adding the number of people who use the specific region;

authentication control processing of controlling biometric authentication of the biometric information acquired when the legitimate user or the second user exits from the specific region; and unlocking control processing of issuing, in a case where the biometric authentication has succeeded, an unlocking instruction to the control system, which corresponds to a gateway of the specific region, and reducing the number of people who use the specific region.

* * * * *